US012603084B2

(12) United States Patent
Lee et al.

(10) Patent No.: US 12,603,084 B2
(45) Date of Patent: Apr. 14, 2026

(54) METHOD, APPARATUS, AND COMPUTER-READABLE RECORDING MEDIUM FOR CONTROLLING RESPONSE UTTERANCE BEING REPRODUCED AND PREDICTING USER INTENTION

(71) Applicant: Saltlux Inc., Seoul (KR)

(72) Inventors: Kyung Il Lee, Seoul (KR); Jong Won Lee, Yongin-si (KR)

(73) Assignee: Saltlux Inc., Seoul (KR)

( * ) Notice: Subject to any disclaimer, the term of this patent is extended or adjusted under 35 U.S.C. 154(b) by 191 days.

(21) Appl. No.: 18/464,240

(22) Filed: Sep. 10, 2023

(65) Prior Publication Data

US 2024/0379097 A1 Nov. 14, 2024

(30) Foreign Application Priority Data

May 10, 2023 (KR) ........................ 10-2023-0060574

(51) Int. Cl.
*G10L 15/18* (2013.01)
*G10L 15/02* (2006.01)
(Continued)

(52) U.S. Cl.
CPC .......... *G10L 15/1815* (2013.01); *G10L 15/02* (2013.01); *G10L 15/04* (2013.01);
(Continued)

(58) Field of Classification Search
CPC ..... G10L 15/1815; G10L 15/02; G10L 15/04; G10L 15/19; G10L 15/22; G10L 2015/088
See application file for complete search history.

(56) References Cited

U.S. PATENT DOCUMENTS 8,725,493 B2 * 5/2014 Womack ............... G06F 40/205
707/706
10,521,512 B2 * 12/2019 Alders .............. G06F 16/90332
(Continued)

FOREIGN PATENT DOCUMENTS

KR 10-2018-0071931 6/2018
KR 10-2019-0131270 11/2019
KR 10-2260219 6/2021

OTHER PUBLICATIONS

Office Action for Korea Patent Application No. 10-2023-0060574, mailed Jul. 27, 2023.

*Primary Examiner* — Daniel C Washburn

(57) ABSTRACT

A method for controlling a response utterance being reproduced and predicting a user intention includes: a voice signal analysis step of, when a second voice signal is received from a user while a first response utterance for responding to a first voice signal is output, starting analysis on the second voice signal; an utterance control step of, when one of preset keywords is identified to be included in a first sentence corresponding to the second voice signal, controlling the first response utterance being output to correspond to the identified keyword; an intention prediction step of, when a third voice signal is received in a state where the first response utterance is controlled, analyzing the third voice signal to predict an intention of the user, which is reflected in a second sentence corresponding to the third voice signal; and a response utterance output step of outputting a response utterance.

15 Claims, 7 Drawing Sheets

(51) Int. Cl.
   *G10L 15/04*       (2013.01)
   *G10L 15/08*       (2006.01)
   *G10L 15/19*       (2013.01)
   *G10L 15/22*       (2006.01)

(52) U.S. Cl.
   CPC ............. *G10L 15/19* (2013.01); *G10L 15/22*
   (2013.01); *G10L 2015/088* (2013.01)

(56)            References Cited

U.S. PATENT DOCUMENTS

| 11,176,598 | B2 * | 11/2021 | D'Souza | ................... | G06N 3/04 |
| 11,580,964 | B2 * | 2/2023 | Jung | ....................... | G10L 15/22 |
| 12,112,128 | B2 * | 10/2024 | Kim | ....................... | G06F 40/268 |
| 2013/0138586 | A1 * | 5/2013 | Jung | ....................... | G06N 20/00 |
| | | | | | 706/14 |

\* cited by examiner

【FIG. 1】

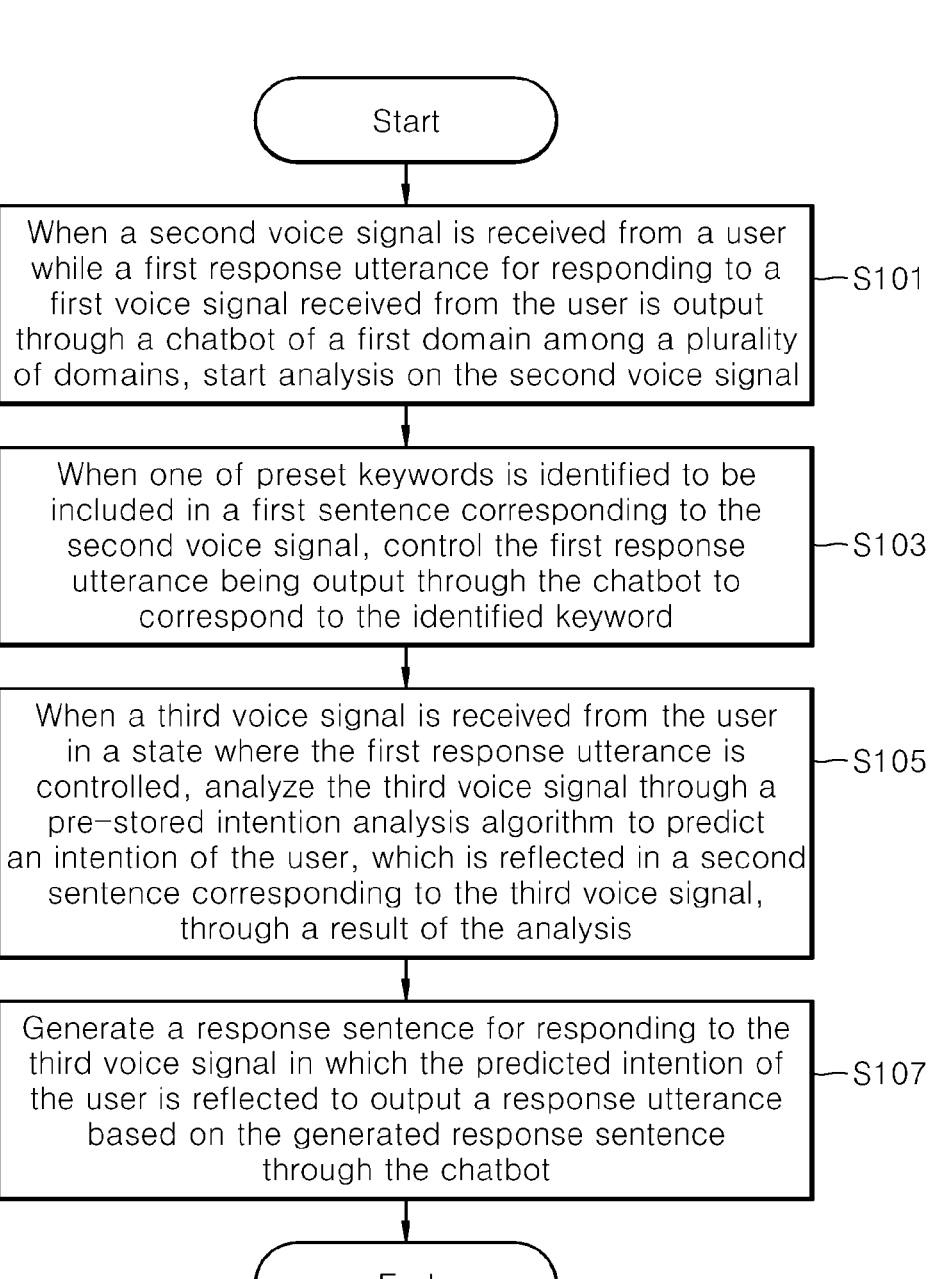

Start

When a second voice signal is received from a user while a first response utterance for responding to a first voice signal received from the user is output through a chatbot of a first domain among a plurality of domains, start analysis on the second voice signal ─S101

When one of preset keywords is identified to be included in a first sentence corresponding to the second voice signal, control the first response utterance being output through the chatbot to correspond to the identified keyword ─S103

When a third voice signal is received from the user in a state where the first response utterance is controlled, analyze the third voice signal through a pre-stored intention analysis algorithm to predict an intention of the user, which is reflected in a second sentence corresponding to the third voice signal, through a result of the analysis ─S105

Generate a response sentence for responding to the third voice signal in which the predicted intention of the user is reflected to output a response utterance based on the generated response sentence through the chatbot ─S107

End

【FIG. 2】
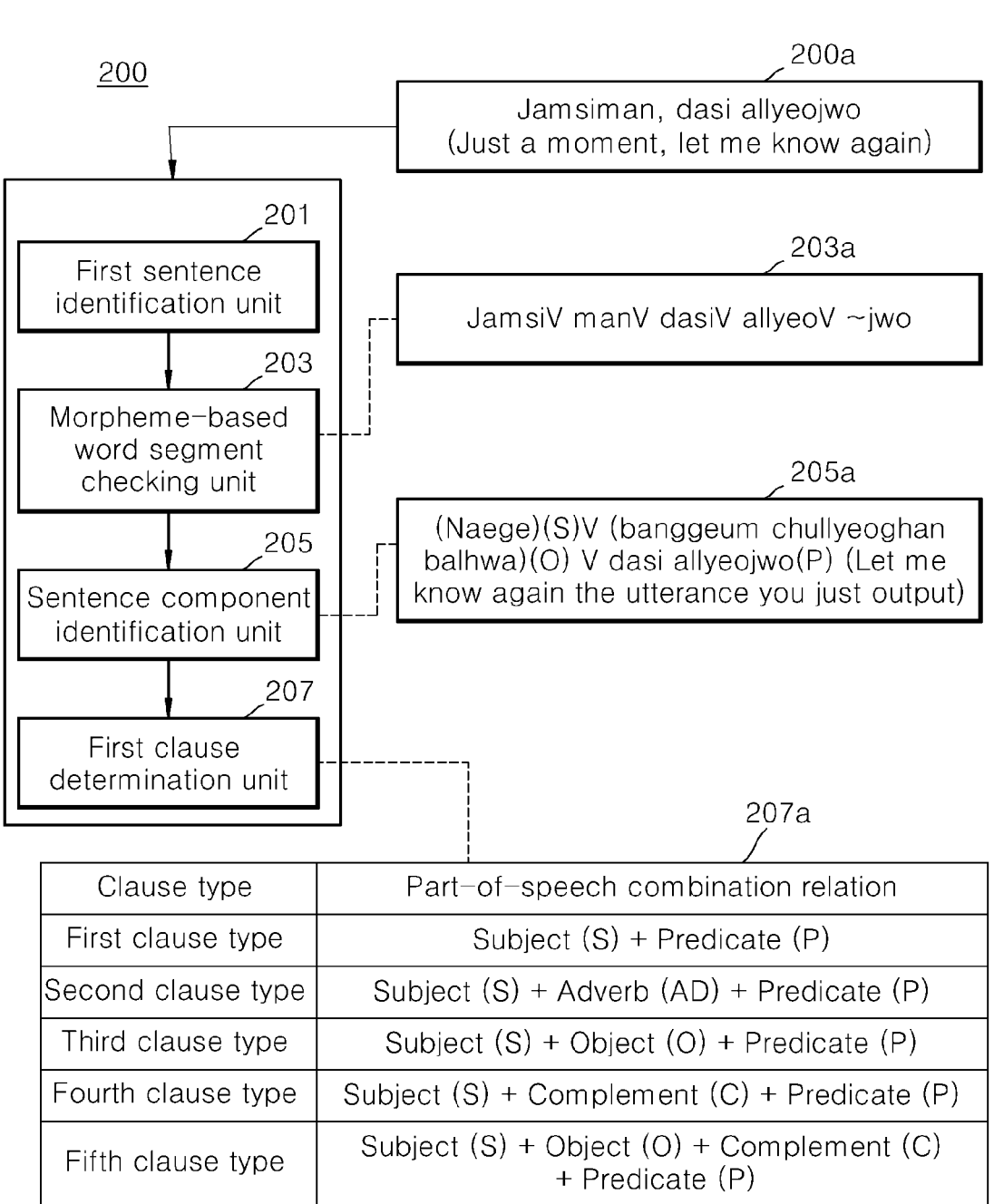
| Clause type | Part-of-speech combination relation |
|---|---|
| First clause type | Subject (S) + Predicate (P) |
| Second clause type | Subject (S) + Adverb (AD) + Predicate (P) |
| Third clause type | Subject (S) + Object (O) + Predicate (P) |
| Fourth clause type | Subject (S) + Complement (C) + Predicate (P) |
| Fifth clause type | Subject (S) + Object (O) + Complement (C) + Predicate (P) |

【FIG. 3】
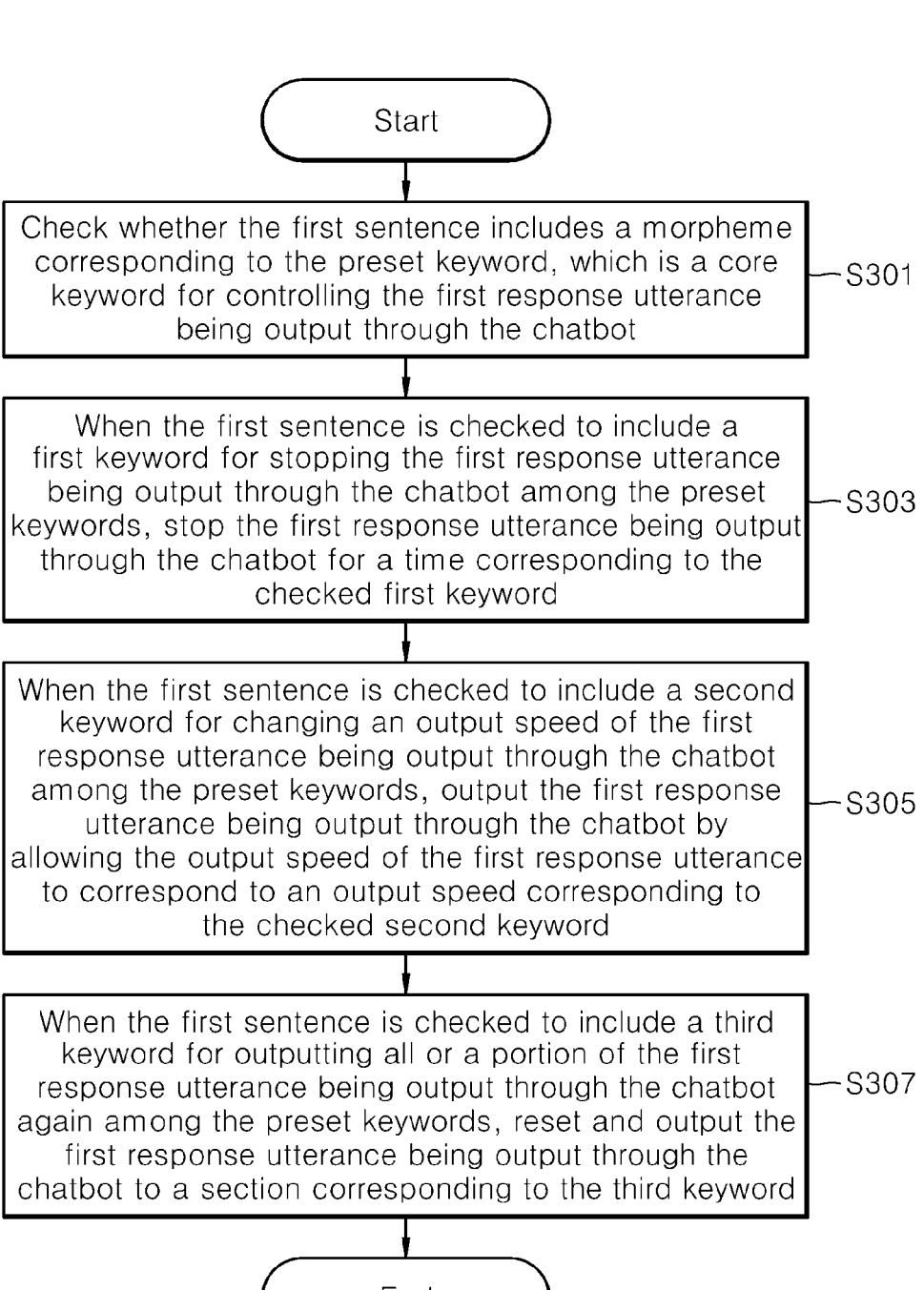

【FIG. 4】

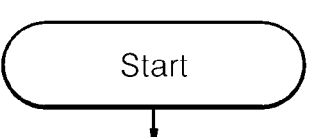

```
                      ┌─────────────────┐
                      │      Start       │
                      └─────────────────┘
                               │
                               ▼
   ┌──────────────────────────────────────────────────────┐
   │  When the third voice signal is received from the user│
   │   in a state where the first response utterance output │
   │  through the chatbot is controlled, preprocess the third│──S401
   │   voice signal through the pre-stored voice recognition │
   │          algorithm to identify the second sentence      │
   │             corresponding to the third voice signal     │
   └──────────────────────────────────────────────────────┘
                               │
                               ▼
   ┌──────────────────────────────────────────────────────┐
   │    When the identification of the second sentence is   │
   │       completed, analyze a plurality of sentences       │
   │     corresponding to voice signals received from the    │
   │  user before the third voice signal is received through │──S403
   │  the pre-stored natural language processing algorithm   │
   │    and the identified second sentence to determine a    │
   │       clause type of each of the sentences and the      │
   │                     second sentence                     │
   └──────────────────────────────────────────────────────┘
                               │
                               ▼
                      ┌─────────────────┐
                      │       End        │
                      └─────────────────┘
```

[FIG. 5]

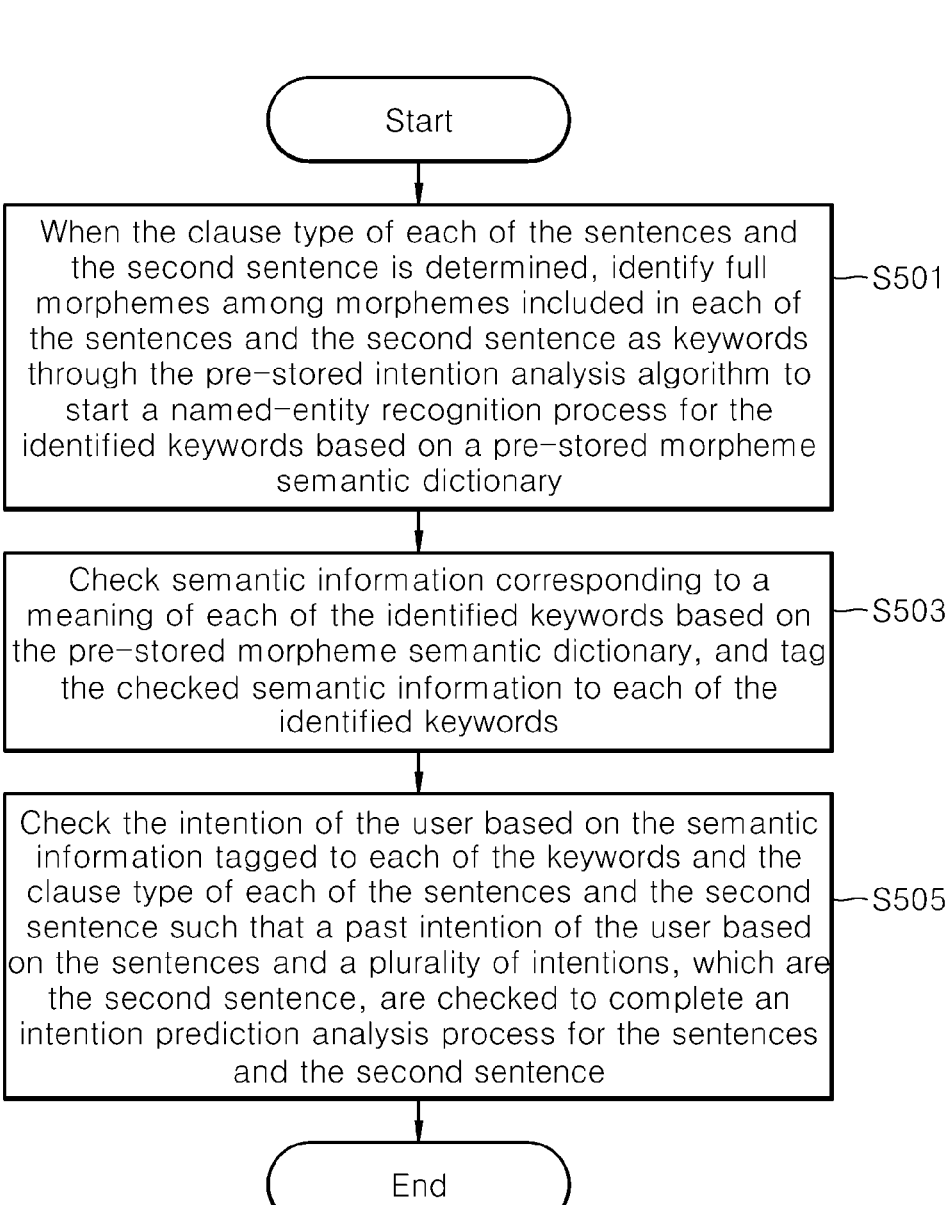

Start

When the clause type of each of the sentences and the second sentence is determined, identify full morphemes among morphemes included in each of the sentences and the second sentence as keywords through the pre-stored intention analysis algorithm to start a named-entity recognition process for the identified keywords based on a pre-stored morpheme semantic dictionary —S501

Check semantic information corresponding to a meaning of each of the identified keywords based on the pre-stored morpheme semantic dictionary, and tag the checked semantic information to each of the identified keywords —S503

Check the intention of the user based on the semantic information tagged to each of the keywords and the clause type of each of the sentences and the second sentence such that a past intention of the user based on the sentences and a plurality of intentions, which are the second sentence, are checked to complete an intention prediction analysis process for the sentences and the second sentence —S505

End

【FIG. 6】
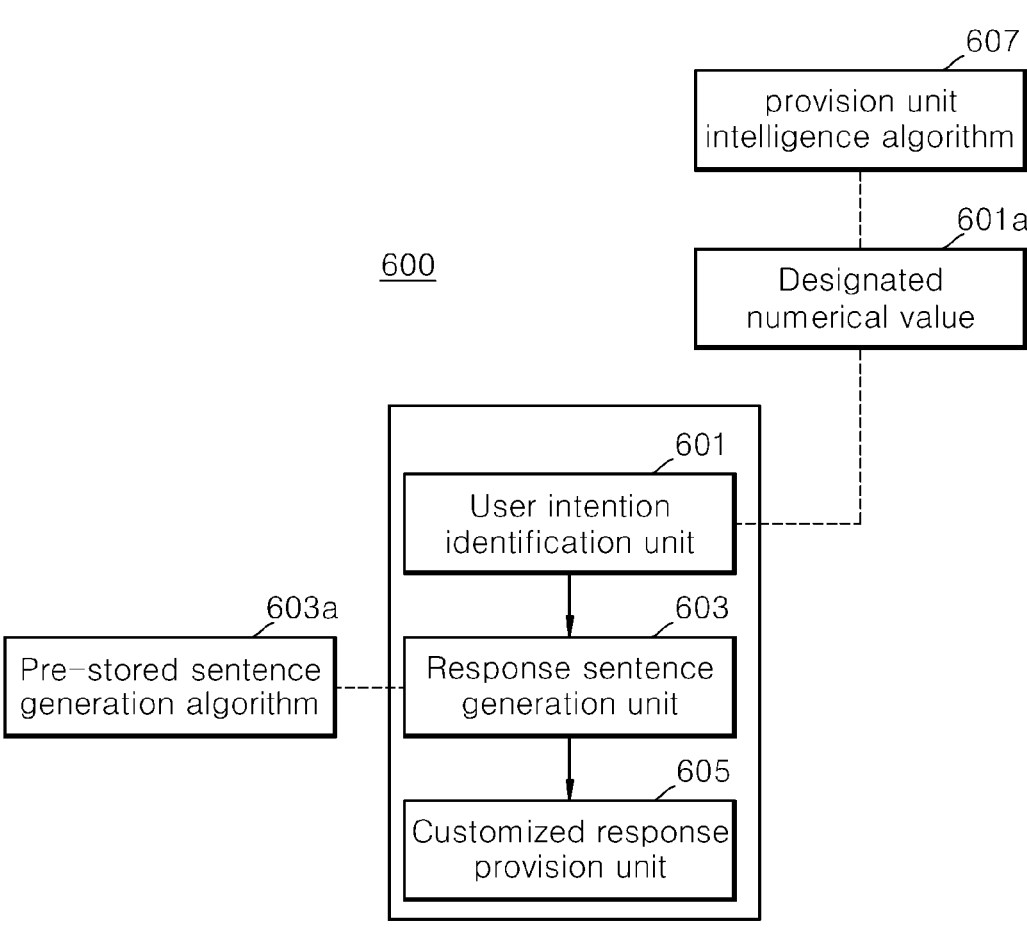

【FIG. 7】
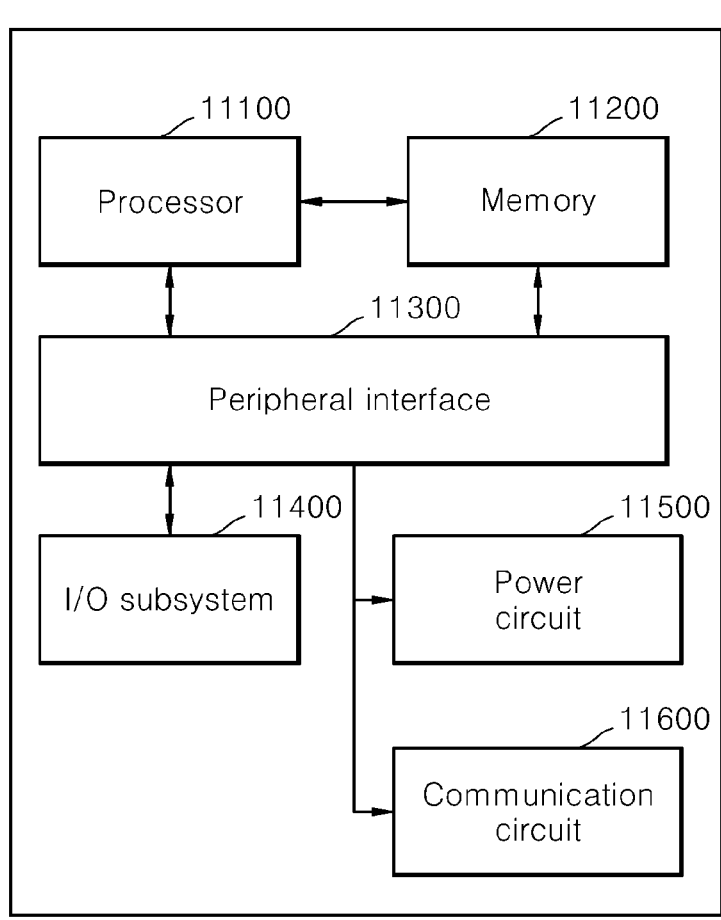

METHOD, APPARATUS, AND COMPUTER-READABLE RECORDING MEDIUM FOR CONTROLLING RESPONSE UTTERANCE BEING REPRODUCED AND PREDICTING USER INTENTION

BACKGROUND OF THE INVENTION

1. Field of the Invention

The present invention relates to a method for controlling a response utterance being reproduced and predicting a user intention, and more particularly, to a technology for starting analysis on a second voice signal when the second voice signal is received from a user while a first response utterance for responding to a first voice signal received from the user is output through a chatbot of a first domain among a plurality of domains, controlling the first response utterance being output through the chatbot to correspond to an identified keyword when one of preset keywords is identified to be included in a first sentence corresponding to the second voice signal, analyzing a third voice signal through a pre-stored intention analysis algorithm to predict an intention of the user, which is reflected in a second sentence corresponding to the third voice signal, when the third voice signal is received from the user in a state where the first response utterance is controlled, and generating a response sentence for responding to the third voice signal in which the predicted intention of the user is reflected to output a response utterance based on the generated response sentence through the chatbot.

2. Description of the Related Art

A conventional interactive artificial intelligence system has a structure in which an input utterance input from a user is subject to natural language processing to recognize a context and an intention, and a response utterance related to the recognized context and the recognized intention is output. In other words, the conventional interactive artificial intelligence system has performed a process for generating a response utterance to another input utterance re-input from the user after the response utterance for the input utterance input from the user is output. Such a process of the interactive artificial intelligence system has been pointed out as a problem that makes the user to feel that it takes a long time to receive the response utterance, and simultaneously, outputs an incorrect response utterance when an intention of the user is changed while the input utterance re-input from the user is related to the input utterance that is previously input.

Accordingly, the industry has been developing various technologies for controlling an output state and an output speed of the response utterance being output, and immediately outputting the response utterance corresponding to the input utterance that is re-input when the input utterance is re-input from the user while the system is performing the response utterance.

As one example, Korean Unexamined Patent Publication No. 10-2021-0085182 (System, Server, and Method for Recognizing User Utterance Intention) discloses a technology for extracting a semantic feature from an utterance voice of a user by each of a plurality of cluster servers, predicting an intention from an intention classification model of a cluster corresponding to the semantic feature, and generating intention prediction information including the predicted intention.

However, the related art described above discloses only a technology for simply predicting the intention of the user from the utterance voice of the user without disclosing a technology for starting analysis on a second voice signal when the second voice signal is received from a user while a first response utterance for responding to a first voice signal received from the user is output through a chatbot of a first domain among a plurality of domains, controlling the first response utterance being output through the chatbot to correspond to an identified keyword when one of preset keywords is identified to be included in a first sentence corresponding to the second voice signal, analyzing a third voice signal through a pre-stored intention analysis algorithm to predict an intention of the user, which is reflected in a second sentence corresponding to the third voice signal, when the third voice signal is received from the user in a state where the first response utterance is controlled, and generating a response sentence for responding to the third voice signal in which the predicted intention of the user is reflected to output a response utterance based on the generated response sentence through the chatbot, so that a need for a technology capable of resolving such a situation is emerging.

SUMMARY OF THE INVENTION

Accordingly, an object of the present invention is to provide a method for controlling a response utterance being reproduced and predicting a user intention to start analysis on a second voice signal when the second voice signal is received from a user while a first response utterance for responding to a first voice signal received from the user is output through a chatbot of a first domain among a plurality of domains, control the first response utterance being output through the chatbot to correspond to an identified keyword when one of preset keywords is identified to be included in a first sentence corresponding to the second voice signal, analyze a third voice signal through a pre-stored intention analysis algorithm to predict an intention of the user, which is reflected in a second sentence corresponding to the third voice signal, when the third voice signal is received from the user in a state where the first response utterance is controlled, and generate a response sentence for responding to the third voice signal in which the predicted intention of the user is reflected to output a response utterance based on the generated response sentence through the chatbot, so that the user who uses the chatbot may be provided with an immersive feeling as if the user is actually having a conversation with another user, and a response utterance based on the intention desired by the user may be immediately provided through the chatbot.

According to one embodiment of the present invention, there is provided a method for controlling a response utterance being reproduced and predicting a user intention, which is implemented in a computing device including at least one processor and at least one memory for storing instructions executable by the processor, the method including: a voice signal analysis step of, when a second voice signal is received from a user while a first response utterance for responding to a first voice signal received from the user is output through a chatbot of a first domain among a plurality of domains, starting analysis on the second voice signal; an utterance control step of, when one of preset keywords is identified to be included in a first sentence corresponding to the second voice signal in a state where execution of a function of the voice signal analysis step is completed, controlling the first response utterance being output through the chatbot to correspond to the identified keyword; an intention prediction step of, when a third voice signal is received from the user in a state where the first response utterance is controlled by execution of a function of the utterance control step, analyzing the third voice signal through a pre-stored intention analysis algorithm to predict an intention of the user, which is reflected in a second sentence corresponding to the third voice signal, through a result of the analysis; and a response utterance output step of, when the intention prediction step is completed, generating a response sentence for responding to the third voice signal in which the predicted intention of the user is reflected to output a response utterance based on the generated response sentence through the chatbot.

The voice signal analysis step may preferably include: a first sentence identification step of, when the second voice signal is received while the first response utterance is output through the chatbot, preprocessing the second voice signal through a pre-stored voice recognition algorithm to identify the first sentence corresponding to the second voice signal; a morpheme-based word segment checking step of, when the identification of the first sentence is completed, identifying a plurality of morphemes included in the first sentence through a pre-stored natural language processing algorithm to check a plurality of word segments constituting the first sentence based on the identified morphemes; a sentence component identification step of, when the checking of the word segments is completed by execution of a function of the morpheme-based word segment checking step, checking a part of speech of each of the morphemes included in the word segments based on pre-stored part-of-speech classification information to identify a sentence component of each of the word segments; and a first clause determination step of, when the identification of the sentence component for each of the word segments is completed by execution of a function of the sentence component identification step, checking a combination relation between the identified sentence components to determine a clause type for the first sentence.

The clause type may be a sentence form for the first sentence determined based on the combination relation between the sentence components for the word segments, and the clause type may include: a first type configured by combining a subject and a predicate; a second type configured by combining the subject, an adverb, and the predicate; a third type configured by combining the subject, an object, and the predicate; a fourth type configured by combining the subject, a complement, and the predicate; and a fifth type configured by combining the subject, the object, the complement, and the predicate.

The utterance control step may include: a keyword checking step of, when the execution of the function of the voice signal analysis step is completed, checking whether the first sentence includes a morpheme corresponding to the preset keyword, which is a core keyword for controlling the first response utterance being output through the chatbot; an utterance stopping step of, when the first sentence is checked to include a first keyword for stopping the first response utterance being output through the chatbot among the preset keywords by execution of a function of the keyword checking step, stopping the first response utterance being output through the chatbot for a time corresponding to the checked first keyword; an utterance output speed control step of, when the first sentence is checked to include a second keyword for changing an output speed of the first response utterance being output through the chatbot among the preset keywords by the execution of the function of the keyword checking step, outputting the first response utterance being output through the chatbot by allowing the output speed of the first response utterance to correspond to an output speed corresponding to the checked second keyword; and an utterance output section control step of, when the first sentence is checked to include a third keyword for outputting all or a portion of the first response utterance being output through the chatbot again among the preset keywords by the execution of the function of the keyword checking step, resetting and outputting the first response utterance being output through the chatbot to a section corresponding to the third keyword.

The intention prediction step may include: a second sentence identification step of, when the third voice signal is received from the user in a state where the first response utterance output through the chatbot is controlled by the execution of the function of the utterance control step, preprocessing the third voice signal through the pre-stored voice recognition algorithm to identify the second sentence corresponding to the third voice signal; and a second clause determination step of, when the identification of the second sentence is completed, analyzing a plurality of sentences corresponding to voice signals received from the user before the third voice signal is received through the pre-stored natural language processing algorithm and the identified second sentence to determine a clause type of each of the sentences and the second sentence.

The intention prediction step may further include: a keyword named-entity analysis step of, when the clause type of each of the sentences and the second sentence is determined, identifying full morphemes among morphemes included in each of the sentences and the second sentence as keywords through the pre-stored intention analysis algorithm to start a named-entity recognition process for the identified keywords based on a pre-stored morpheme semantic dictionary; a semantic information tagging step of, as a function of the keyword named-entity analysis step is performed, checking semantic information corresponding to a meaning of each of the identified keywords based on the pre-stored morpheme semantic dictionary, and tagging the checked semantic information to each of the identified keywords; and an intention checking step of, when the semantic information tagging step is completed, checking the intention of the user based on the semantic information tagged to each of the keywords and the clause type of each of the sentences and the second sentence such that a past intention of the user based on the sentences and a plurality of intentions, which are a candidate group based on a meaning derived from the second sentence, are checked to complete an intention prediction analysis process for the sentences and the second sentence.

The response utterance output step may include: a user intention identification step of, when execution of a function of the intention prediction step is completed, identifying an intention in which an association degree with the past intention exceeds a designated numerical value among the intentions as the intention of the user; a response sentence generation step of, when the identification of the intention of the user is completed, generating the response sentence for responding to the third voice signal in which the intention of the user is reflected based on a pre-stored sentence generation algorithm; and a customized response provision step of, when execution of a function of the response sentence generation step is completed, stopping the first response utterance controlled by the execution of the function of the utterance control step and outputting a second response utterance based on the generated response sentence to provide a customized response for the third voice signal input from the user.

The designated numerical value may be a configuration derived by analyzing conversation history information in which a response utterance process for a voice signal input through the chatbot from each of a plurality of users who visit the first domain is completed based on a pre-stored artificial intelligence algorithm, and the designated numerical value may be a reference value for identifying semantic information corresponding to the intention of the user among a plurality of pieces of semantic information tagged to the keywords, respectively, based on a correlation between a combination relation of keywords corresponding to full morphemes among morphemes constituting a sentence based on the conversation history information and a conversation order based on the conversation history information.

According to one embodiment of the present invention, there is provided an apparatus for controlling a response utterance being reproduced and predicting a user intention, which is implemented in a computing device including at least one processor and at least one memory for storing instructions executable by the processor, the apparatus including: a voice signal analysis unit for, when a second voice signal is received from a user while a first response utterance for responding to a first voice signal received from the user is output through a chatbot of a first domain among a plurality of domains, starting analysis on the second voice signal; an utterance control unit for, when one of preset keywords is identified to be included in a first sentence corresponding to the second voice signal in a state where execution of a function of the voice signal analysis unit is completed, controlling the first response utterance being output through the chatbot to correspond to the identified keyword; an intention prediction unit for, when a third voice signal is received from the user in a state where the first response utterance is controlled by execution of a function of the utterance control unit, analyzing the third voice signal through a pre-stored intention analysis algorithm to predict an intention of the user, which is reflected in a second sentence corresponding to the third voice signal, through a result of the analysis; and a response utterance output unit for, when execution of a function of the intention prediction unit is completed, generating a response sentence for responding to the third voice signal in which the predicted intention of the user is reflected to output a response utterance based on the generated response sentence through the chatbot.

According to one embodiment of the present invention, there is provided a computer-readable recording medium, wherein the computer-readable recording medium stores instructions for allowing a computing device to perform: a voice signal analysis step of, when a second voice signal is received from a user while a first response utterance for responding to a first voice signal received from the user is output through a chatbot of a first domain among a plurality of domains, starting analysis on the second voice signal; an utterance control step of, when one of preset keywords is identified to be included in a first sentence corresponding to the second voice signal in a state where execution of a function of the voice signal analysis step is completed, controlling the first response utterance being output through the chatbot to correspond to the identified keyword; an intention prediction step of, when a third voice signal is received from the user in a state where the first response utterance is controlled by execution of a function of the utterance control step, analyzing the third voice signal through a pre-stored intention analysis algorithm to predict an intention of the user, which is reflected in a second sentence corresponding to the third voice signal, through a result of the analysis; and a response utterance output step of, when the intention prediction step is completed, generating a response sentence for responding to the third voice signal in which the predicted intention of the user is reflected to output a response utterance based on the generated response sentence through the chatbot.

According to the method for controlling the response utterance being reproduced and predicting the user intention of the present invention, a communication delay between a user and a chatbot can be reduced, and the user can be provided with an immersive feeling as if the user is having a conversation with another user, which may not be provided by a chatbot implemented as a conventional interactive artificial intelligence system.

BRIEF DESCRIPTION OF THE DRAWINGS

FIG. 1 is a flowchart for describing a method for controlling a response utterance being reproduced and predicting a user intention according to one embodiment of the invention.

FIG. 2 is a block diagram for describing a voice signal analysis unit of an apparatus for controlling a response utterance being reproduced and predicting a user intention according to one embodiment of the present invention.

FIG. 3 is a flowchart for describing an utterance control step of the method for controlling the response utterance being reproduced and predicting the user intention according to one embodiment of the present invention.

FIG. 4 is a flowchart for describing an intention prediction step of the method for controlling the response utterance being reproduced and predicting the user intention according to one embodiment of the present invention.

FIG. 5 is another flowchart for describing an intention prediction step of the method for controlling the response utterance being reproduced and predicting the user intention according to one embodiment of the present invention.

FIG. 6 is a block diagram for describing a response utterance output unit of the apparatus for controlling the response utterance being reproduced and predicting the user intention according to one embodiment of the present invention.

FIG. 7 is a view for describing one example of an internal configuration of a computing device according to one embodiment of the present invention.

DETAILED DESCRIPTION OF THE INVENTION

Hereinafter, various embodiments and/or aspects will be disclosed with reference to the drawings. In the following description, for the purpose of description, numerous specific details are set forth in order to facilitate an overall understanding of one or more aspects. However, it will also be appreciated by a person having ordinary skill in the art to which the present invention pertains that such aspect(s) may be practiced without the specific details. The following description and the accompanying drawings will be set forth in detail for specific illustrative aspects among the one or more aspects. However, the aspects are provided for illustrative purposes, some of various schemes based on principles of various aspects may be employed, and descriptions set forth herein are intended to include all the aspects and equivalents thereof.

The terms "embodiment", "example", "aspect", "illustration", and the like used herein may not be construed as indicating that any aspect or design set forth herein is preferable or advantageous over other aspects or designs.

In addition, it is to be understood that the terms "include" and/or "comprise" indicate the presence of corresponding features and/or elements, but do not preclude the presence or addition of one or more other features, elements, and/or groups thereof.

In addition, although the terms including ordinal numbers such as "first" and "second" may be used to describe various elements, the elements are not limited by the terms. The above terms are used merely for the purpose of distinguishing one element from another element. For example, a first element may be termed as a second element, and similarly, a second element may also be termed as a first element without departing from the scope of the present invention. The term "and/or" includes any combination of a plurality of described relevant items, or one of the described relevant items.

In addition, unless defined otherwise, all terms used in embodiments of the present invention, including technical and scientific terms, have the same meaning as those commonly understood by a person having ordinary skill in the art to which the present invention pertains. Any terms as those defined in generally used dictionaries are to be interpreted to have the meanings consistent with the contextual meanings in the relevant field of art, and are not to be interpreted to have idealistic or excessively formalistic meanings unless explicitly defined in the embodiments of the present invention.

FIG. 1 is a flowchart for describing a method for controlling a response utterance being reproduced and predicting a user intention according to one embodiment of the invention.

Referring to FIG. 1, a method for controlling a response utterance being reproduced and predicting a user intention, which is implemented in a computing device including at least one processor and at least one memory for storing instructions executable by the processor, may include a voice signal analysis step (step S101), an utterance control step (step S103), an intention prediction step (step S105), and a response utterance output step (step S107).

In the step S101, the at least one processor (hereinafter referred to as "processor") may, when a second voice signal is received from a user while a first response utterance for responding to a first voice signal received from the user is output through a chatbot of a first domain among a plurality of domains, start analysis on the second voice signal.

Regarding the above configuration, the domains may be platforms in which the chatbot is implemented, for example, a configuration in which the chatbot is implemented in a bank platform, a public institution platform, and a shopping mall platform.

According to one embodiment, the processor may receive the first voice signal from the user through an electronic device (e.g., a kiosk, a server, etc.) in which the chatbot is implemented. Regarding the above configuration, the processor may analyze a sentence corresponding to the first voice signal through a voice recognition algorithm based on a speech-to-text (STT) model, and output the first response utterance for responding to the analyzed sentence.

According to another embodiment, the processor may receive a voice signal from the user or receive an input signal configured as a text according to a form of the electronic device in which the chatbot is implemented.

According to one embodiment, the processor may receive a second voice signal from the user while outputting the first response utterance. The processor may start analyzing the second voice signal when the first voice signal is received. Regarding the above configuration, an operation in which the processor analyzes the second voice signal will be described in detail with reference to FIG. 2.

According to one embodiment, the processor may perform the utterance control step (step S103) when the analysis on the second voice signal is completed by execution of a function of the voice signal analysis step (step S101).

In the step S103, the processor may, when one of preset keywords is identified to be included in a first sentence corresponding to the second voice signal in a state where execution of a function of the voice signal analysis step (step S101) is completed, control the first response utterance being output through the chatbot to correspond to the identified keyword.

According to one embodiment, the preset keyword may be a configuration including a first keyword (e.g., "stop, "just a moment", etc.) for stopping the output of the first voice signal output through the chatbot, a second keyword (e.g., "tell me a little faster", "tell me a little slower", etc.) for changing an output speed of the first voice signal output through the chatbot, and a third keyword (e.g., "tell me again the portion you just said") for outputting an entire section or a partial section of the first voice signal output through the chatbot again.

In other words, the processor may perform natural language processing on the first sentence corresponding to the second voice signal by the execution of the function of the voice signal analysis step (step S101) to identify that one of the preset keywords is included in the first sentence. Accordingly, the processor may, when the preset keyword is identified to be included in the first sentence, control the first response utterance being output through the chatbot to correspond to the identified preset keyword.

According to one embodiment, the processor may, when a third voice signal is received from the user in a state where a function of the utterance control step (step S103) is executed, perform the intention prediction step (step S105).

In the step S105, the processor may, when a third voice signal is received from the user in a state where the first response utterance is controlled by execution of a function of the utterance control step (step S103), analyze the third voice signal through a pre-stored intention analysis algorithm to predict an intention of the user, which is reflected in a second sentence corresponding to the third voice signal, through a result of the analysis.

Regarding the above configuration, a conventional interactive artificial intelligence system (chatbot system) has a structure in which an input utterance input from a user is subject to natural language processing to recognize a context and an intention, and a response utterance related to the recognized context and the recognized intention is output. In other words, the conventional interactive artificial intelligence system may perform a process for generating a response utterance to another input utterance (corresponding to the second voice signal and the third voice signal) re-input from the user after the response utterance for the input utterance (corresponding to the first voice signal) input from the user is output from the beginning, which has a problem that makes the user to feel that it takes a long time to receive the response utterance, and simultaneously, outputs an incorrect response utterance when an intention of the user is changed while the input utterance (corresponding to the second voice signal and the third voice signal) re-input from the user is related to the input utterance (corresponding to the first voice signal) that is previously input.

한다 .

Accordingly, the present invention may be an invention that discloses a technical feature for, when the chatbot receives the second voice signal from the user while the response utterance for responding to the first voice signal input from the user is output, predicting the intention of the user reflected in the third voice signal to output a suitable response utterance when the third voice signal is input from the user in a state where at least one of an output state, speed adjustment, and section repetition of the response utterance being output is applied.

In other words, the intention prediction step (step S105) may be a process performed to predict the intention of the user reflected in the second voice signal and the third voice signal to output a suitable response utterance when the second voice signal and the third voice signal are input from the user while the response utterance for responding to the input first voice signal is output through the chatbot.

In the intention prediction step (step S105), a method for analyzing the third voice signal by the processor to predict the intention of the user may be predicted by utilizing an algorithm based on some models included in a natural language procedure (NLP) algorithm, which is an algorithm for allowing a computer to understand a natural language that is a language used by a human. Regarding the above configuration, an operation in which the processor predicts the intention of the user will be described in detail with reference to FIGS. 4 and 5.

According to one embodiment, the processor may perform the response utterance output step (step S107) when the intention prediction step (step S105) is completed.

In the step S107, the processor may, when the intention prediction step is completed, generate a response sentence for responding to the third voice signal in which the predicted intention of the user is reflected to output a response utterance based on the generated response sentence through the chatbot.

According to one embodiment, the processor may, when the prediction for the intention of the user is completed, output the response utterance based on the response sentence for responding to the third voice signal in which the intention of the user is reflected.

In this case, since the response utterance for responding to the first voice signal is controlled by the execution of the function of the utterance control step (step S103), the processor may stop outputting the response utterance for responding to the first voice signal being output, and output the response utterance based on the response sentence for responding to the third voice signal.

According to one embodiment, a method for controlling a response utterance being reproduced and predicting a user intention, which is implemented in a computing device including at least one processor and at least one memory for storing instructions executable by the processor, may include a process checking response utterance output step (not shown).

Regarding the above configuration, the process checking response utterance output step may perform the function performed by the response utterance output step (step S105) so as to perform steps corresponding to the detailed steps included in the response utterance output step.

According to one embodiment, the process checking response utterance output step may be a step performed when a plurality of past request processes corresponding to voice signals received before the third voice signal is received, respectively, are provided in a state where the intention of the user reflected in the third voice signal is checked as an intention to request checking on one of the past request processes that are previously requested by execution of a function of the intention prediction step.

According to one embodiment, the process checking response utterance output step may be a step of, when a plurality of past request processes corresponding to voice signals received before the third voice signal is received, respectively, are provided in a state where the intention of the user reflected in the third voice signal is checked as an intention to request checking on one of the past request processes that are previously requested by execution of a function of the intention prediction step (step S105), analyzing pre-stored process history information and the intention of the user reflected in the third voice signal to identify a past request process based on the intention of the user reflected in the third voice signal, and generating a process checking response sentence for allowing the user to check the identified past request process to output a process checking response utterance based on the generated process checking response sentence through the chatbot.

According to one embodiment, the process checking utterance output step may include a past request process checking step (not shown), an intention-based process search step (not shown), and a process checking response provision step (not shown) as the detailed steps for performing the function described above.

In the past request process checking step, the processor may, when the intention of the user reflected in the third voice signal is checked as the intention to request the checking on one of the part request processes that are previously requested in a state where the execution of the function of the intention prediction step is completed, check a past request process that is previously requested by the user.

According to one embodiment, the processor may, when the intention of the user reflected in the third voice signal is checked as the intention to request the checking on one of the part request processes that are previously requested, check the past request process that is previously requested by the user based on the voice signals received from the user before the third voice signal is received.

According to one embodiment, the processor may, when the checking of the past request process is completed, perform the intention-based process search step.

In the intention-based process search step, the processor may, when the past request processes corresponding to the voice signals received before the third voice signal is received, respectively, are checked by execution of a function of the past request process checking step, analyze the pre-stored process history information and the intention of the user reflected in the third voice signal.

According to one embodiment, the processor may, when the past request processes are checked in the past request process checking step, analyze the pre-stored process history information stored in a process processing database and the intention of the user reflected in the third voice signal.

According to one embodiment, the pre-stored process history information may be information including a type of a process requested by the user, an operation name of the process, an instruction trigger received from the user to start the process, a progress state of the process, a completion state of the process, a success state of the process, a detailed progress situation of the process, and the like.

Accordingly, the processor may analyze pieces of detailed information included in each of the pre-stored process history information and the intention of the user reflected in the third voice signal to identify specific process history information corresponding to the intention of the user reflected in the third voice signal among the pre-stored process history information.

For example, when the intention of the user reflected in the third voice signal is an intention to check whether remittance to a user "A" has been completed, the processor may check detailed information included in each of the pre-stored process history information to identify first process history information, which is process history information for performing remittance to the user "A".

According to one embodiment, the processor may, when the analysis of the pre-stored process history information and the intention of the user reflected in the third voice signal is completed, perform a process checking response provision step.

In the process checking response provision step, the processor may identify the past request process based on the intention of the user reflected in the third voice signal through a result of analyzing the pre-stored process history information and the intention of the user reflected in the third voice signal by execution of a function of the intention-based process search step, and generate the process checking response sentence for allowing the user to check the identified past request process to output the process checking response utterance based on the generated process checking response sentence through the chatbot.

For example, the processor may, when the first process history information is identified through the result of analyzing the pre-stored process history information and the intention of the user reflected in the third voice signal by the execution of the function of the intention-based process search step, identify that the past request process for a checking request based on the intention of the user reflected in the third voice signal is an operation for performing the remittance to the user "A" based on the first process history information.

Accordingly, in order to generate the process checking response sentence for allowing the user to check the identified past request process, the processor may analyze detailed information included in the first process history information based on a pre-stored sentence generation algorithm to generate the process checking response sentence. Thereafter, the processor may output the process checking response utterance based on the generated process checking response sentence through the chatbot.

FIG. 2 is a block diagram for describing a voice signal analysis unit of an apparatus for controlling a response utterance being reproduced and predicting a user intention according to one embodiment of the present invention.

Referring to FIG. 2, an apparatus for controlling a response utterance and predicting a user intention, which is implemented in a computing device including at least one processor and at least one memory for storing instructions executable by the processor, may include a voice signal analysis unit 200 (e.g., for performing the same function as the voice signal analysis step (step S101) of FIG. 1).

According to one embodiment, the voice signal analysis unit 200 may, when a second voice signal is received from a user while a first response utterance for responding to a first voice signal received from the user is output through a chatbot of a first domain among a plurality of domains, start analysis on the second voice signal.

According to one embodiment, the voice signal analysis unit 200 may be a detailed configuration for performing the function described above, and may include a first sentence identification unit 201, a morpheme-based word segment checking unit 203, a sentence component identification unit 205, and a first clause determination unit 207.

According to one embodiment, the first sentence identification unit 201 may, when the second voice signal is received while the first response utterance is output through the chatbot, preprocess the second voice signal through a pre-stored voice recognition algorithm to identify a first sentence 200a corresponding to the second voice signal.

Regarding the above configuration, the pre-stored voice recognition algorithm may be a speech-to-text (STT) modeling-based algorithm, which is an algorithm for preprocessing a voice signal received from a user to convert the voice signal into a first sentence that is a text.

According to one embodiment, the first sentence identification unit 201 may, when the second voice signal is received from the user, preprocess the second voice signal through the pre-stored voice recognition algorithm to identify the first sentence 200a corresponding to the second voice signal.

For example, when the apparatus for controlling the response utterance and predicting the user intention receives the second voice signal from the user while a response utterance for responding to the first voice signal received from the user is output, the first sentence identification unit 201 may preprocess the second voice signal through the pre-stored voice recognition algorithm to identify "Just a moment, let me know again", which is the first sentence 200a corresponding to the second voice signal.

According to one embodiment, the morpheme-based word segment checking unit 203 may, when the identification of the first sentence 200a is completed, identify a plurality of morphemes included in the first sentence 200a through a pre-stored natural language processing algorithm to check a plurality of word segments constituting the first sentence 200a based on the identified morphemes.

For example, the morpheme-based word segment checking unit 203 may analyze "Just a moment, let me know again", which is the first sentence 200a identified by the first sentence identification unit 201, through the pre-stored natural language processing algorithm.

Accordingly, the morpheme-based word segment checking unit 203 may decompose "Jamsiman, dasi allyeojwo (Just a moment, let me know again)", which is the identified first sentence 200a, into "Jamsi" v "man" v "dasi" v "allyeojw" v "o" to decompose the sentence into a total of five morphemes 201a.

Regarding the above configuration, the morpheme-based word segment checking unit 203 may, when the first sentence 200a is identified as a plurality of morphemes 201a, classify each of the identified morphemes 201a.

Types of the morphemes may be classified into a free morpheme (a morpheme that may be used alone (e.g., weather)), a bound morpheme (a morpheme that is bound to other words (e.g., ~eul, ~neun, ~da)), a full morpheme (a morpheme having a substantial meaning (e.g., today)), and an empty morpheme (a morpheme that adds a grammatical relation or a formal meaning (e.g., a postposition, a suffix, or an affix)), and the morpheme-based word segment checking unit 203 may analyze a type of each of the decomposed morphemes. In this case, the morpheme-based word segment checking unit 203 may classify and check the type of each of the decomposed morphemes based on pre-stored morpheme information.

According to one embodiment, the morpheme-based word segment checking unit 203 may, when the identification of the morphemes of the first sentence 200a is completed, check the word segments constituting the first sentence 200a based on the identified morphemes.

According to one embodiment, the morpheme-based word segment checking unit 203 may perform a tokenization process in order to check at least one word segment in the sentence 200a. In this case, since the Korean language is generally an agglutinative language in which morphemes do not include only independent words unlike the English language, the morpheme-based word segment checking unit 203 may perform a morpheme tokenization scheme rather than a word tokenization scheme when the tokenization process is performed.

According to one embodiment, the morpheme-based word segment checking unit 203 may recognize a plurality of morphemes and types of the morphemes included in the sentence 200a, classify the types of the morphemes, and recognize a combination of a free morpheme and a bound morpheme as one token to designate the recognized token as one word segment.

According to one embodiment, the morpheme-based word segment checking unit 203 may perform the tokenization process in the morpheme tokenization scheme to check a plurality of word segments included in the sentence 200a. For example, the morpheme-based word segment checking unit 203 may check a word segment in "Just a moment, let me know again". The morpheme-based word segment checking unit 203 may perform morpheme tokenization on "Jamsiman, dasi allyeojwo (Just a moment, let me know again)" to check three word segments, which are "Jamsiman" v "dasi" v "allyeojwo".

According to one embodiment, the sentence component identification unit 205 may, when the checking of the word segments is completed by execution of a function of the morpheme-based word segment checking unit 203, check a part of speech of each of the morphemes included in the word segments based on pre-stored part-of-speech classification information to identify a sentence component of each of the word segments.

According to one embodiment, the sentence component identification unit 205 may check the part of speech for each of the morphemes included in the word segments based on the pre-stored part-of-speech classification information to classify the sentence component of each of the word segments through the checked part of speech. In this case, the pre-stored part-of-speech classification information may represent part-of-speech tag information.

According to one embodiment, the sentence component identification unit 205 may define a part of speech for each of the morphemes through the pre-stored part-of-speech classification information. The Korean language may basically define a part of speech of each of the morphemes through a five-word nine-part-of-speech tagging (part-of-speech tagging) technology. The pre-stored part-of-speech classification information may include reference morpheme information (including part-of-speech information) for defining the part of speech of each of the morphemes.

In more detail, the sentence component identification unit 205 may define the part of speech for each of the morphemes through the pre-stored part-of-speech classification information, and determine a sentence component of a configuration recognized as one token among the morphemes in which the part of speech are defined. For example, the sentence component identification unit 205 may classify a part of speech for "allyeojwo" based on the pre-stored part-ofspeech classification information. The sentence component identification unit 205 may classify "allyeojw" as a verb, and classify "~o" as a postposition in the "allyeojwo". The sentence component identification unit 205 may determine a sentence component of "allyeojwo", which is recognized as one token, as a predicate based on the classified part of speech.

According to one embodiment, the first clause determination unit 207 may, when the classification of the sentence component for each of the word segments is completed by execution of a function of the sentence component identification unit 205, check a combination relation between the classified sentence components to determine a clause type for the first sentence.

According to one embodiment, the first clause determination unit 207 may, when the classification of the sentence component for each of the word segments is completed by execution of a function of the sentence component identification unit 205, check a combination relation between the classified sentence components to determine a clause type for the first sentence 200a. In other words, the clause type for the sentence may be a configuration determined fundamentally based on a morpheme.

According to one embodiment, the first clause determination unit 207 may determine the clause type of the sentence through a clause type table 207a.

Regarding the above configuration, a first clause type may be a clause type by a combination of a subject and a predicate, a second clause type may be a clause type by a combination of a subject, an adverb, and a predicate, a third clause type may be a clause type by a combination of a subject, an object, and a predicate, a fourth clause type may be a clause type by a combination of a subject, a complement, and a predicate, and a fifth clause type may be a clause type by a combination of a subject, an object, a complement, and a predicate.

In other words, the clause type may be a sentence form for a sentence (e.g., at least one of the first sentence and the second sentence) determined based on the combination relation between the sentence components for the word segments.

According to one embodiment, the first clause determination unit 207 may check the combination relation between the sentence components for the word segments to determine the clause type for the first sentence 200a based on the contents disclosed in the table 207a.

FIG. 3 is a flowchart for describing an utterance control step of the method for controlling the response utterance being reproduced and predicting the user intention according to one embodiment of the present invention.

Referring to FIG. 3, the method for controlling the response utterance being reproduced and predicting the user intention, which is implemented in the computing device including the at least one processor and the at least one memory for storing the instructions executable by the processor, may include an utterance control step (e.g., the utterance control step (step S103) of FIG. 1).

According to one embodiment, the utterance control step may, when one of preset keywords is identified to be included in a first sentence corresponding to the second voice signal in a state where execution of a function of a voice signal analysis step (e.g., the voice signal analysis step (step S101) of FIG. 1) is completed, control the first response utterance being output through the chatbot to correspond to the identified keyword.

According to one embodiment, the utterance control step may be a detailed step for performing the function described above, and may include a keyword checking step (step S301), an utterance stopping step (step S303), an utterance output speed control step (step S305), and an utterance output section control step (step S307).

In the step S301, the at least one processor (hereinafter referred to as "processor") may, when the execution of the function of the voice signal analysis step is completed, check whether the first sentence includes a morpheme corresponding to the preset keyword, which is a core keyword for controlling the first response utterance being output through the chatbot.

According to one embodiment, the processor may check whether the morpheme corresponding to the preset keyword is included among a plurality of morphemes included in the first sentence corresponding to the second voice signal by the execution of the function of the voice signal analysis step.

For example, the processor may, when the first sentence corresponding to the second voice signal is "Just a moment, let me know again", check whether the morpheme corresponding to the preset keyword is included among a plurality of morphemes included in the first sentence by the execution of the function of the voice signal analysis step.

According to one embodiment, the processor may perform the utterance stopping step (step S303) when the first sentence is checked to include a first keyword by execution of a function of the keyword checking step (step S301).

In the step S303, the processor may, when the first sentence is checked to include a first keyword for stopping the first response utterance being output through the chatbot among the preset keywords by execution of a function of the keyword checking step (step S301), stop the first response utterance being output through the chatbot for a time corresponding to the checked first keyword.

Regarding the above configuration, the first keyword may be a morpheme for stopping the first response utterance for responding to the first voice signal output through the chatbot, which is a keyword including, for example, "a moment", "stop", "just a moment", "stop for only 30 seconds", and the like.

For example, when the first sentence is "Just a moment, let me know again", the processor may check that the first sentence includes "Just a moment", which is the first keyword. Accordingly, the processor may stop the first response utterance for responding to the first voice signal being output through the chatbot.

In this case, the processor may, when the first keyword included in the first sentence is a keyword for which a stopping time is not set, such as "a moment", "stop", or "just a moment", stop the output of the first response utterance for a preset stopping time, and output an utterance for requesting whether to stop the output of the first response utterance again through the chatbot when the preset stopping time elapses.

According to one embodiment, the processor may perform the utterance output speed control step (step S305) when the first sentence is checked to include a second keyword by the execution of the function of the keyword checking step (step S301).

In the step S305, the processor may, when the first sentence is checked to include a second keyword for changing an output speed of the first response utterance being output through the chatbot among the preset keywords by the execution of the function of the keyword checking step (step S301), output the first response utterance being output through the chatbot by allowing the output speed of the first response utterance to correspond to an output speed corresponding to the checked second keyword.

Regarding the above configuration, the second keyword may be a morpheme for adjusting the output speed of the first response utterance for responding to the first voice signal output through the chatbot, which is a keyword including, for example, "tell me slowly", "tell me quickly", "tell me at the original speed", "tell me more quickly", and the like.

For example, when the first sentence is "Just a moment, let me know slowly", the processor may check that the first sentence includes "slowly", which is the second keyword. Accordingly, the processor may output the first response utterance for responding to the first voice signal being output through the chatbot by allowing the output speed of the first response utterance to be slow.

Regarding the above configuration, in a case where the first sentence is "Just a moment, let me know slowly", the processor may, when the first sentence is checked to include "Just a moment", which is the first keyword, and "slowly", which is the second keyword, temporarily stop the first response utterance output through the chatbot to correspond to "Just a moment", which is the first keyword, and identify that "let me know slowly" that is sequentially input is intended to output the first response utterance by allowing the output speed to be slow so as to re-output the first response utterance that is temporarily stopped such that the output speed is controlled to be slow for the output.

According to one embodiment, the processor may, when the second keyword included in the first sentence is a keyword for which a multiple of the output speed is not set, such as "tell me quickly", "tell me slowly", or "tell me more quickly", control the output speed of the first response utterance at a preset multiple interval according to a number of times that the second keyword is input.

According to one embodiment, the processor may perform the utterance output section control step (step S307) when the first sentence is checked to include a third keyword by the execution of the function of the keyword checking step (step S301).

In the step S307, the processor may, when the first sentence is checked to include a third keyword for outputting all or a portion of the first response utterance being output through the chatbot again among the preset keywords by the execution of the function of the keyword checking step (step S301), reset and output the first response utterance being output through the chatbot to a section corresponding to the third keyword.

Regarding the above configuration, the third keyword may be a morpheme for re-outputting all or a portion of the first response utterance for responding to the first voice signal output through the chatbot, which is a keyword including, for example, "tell me again the portion you just said", "tell me from the beginning", "tell me again what you said one minute ago", and the like.

For example, when the first sentence is "Just a moment, tell me again the portion you just said", the processor may check that the first sentence includes "just", "portion", and "again", which are the third keywords. Accordingly, the processor may re-output a portion corresponding to a section that is output immediately before in the first response utterance for responding to the first voice signal being output through the chatbot.

Regarding the above configuration, in a case where the first sentence is "Just a moment, let me know the portion you just said again", the processor may, when the first sentence is checked to include "Just a moment", which is the first keyword, and "just", "portion", and "again", which are the third keywords, temporarily stop the first response utterance output through the chatbot to correspond to "Just a moment", which is the first keyword, and identify that "let me know the portion you just said again" that is sequentially input is intended to output the section of the first response utterance, which is output immediately before, so as to re-output the first response utterance that is temporarily stopped such that the section of the first response utterance that is output immediately before is output.

FIG. 4 is a flowchart for describing an intention prediction step of the method for controlling the response utterance being reproduced and predicting the user intention according to one embodiment of the present invention.

Referring to FIG. 4, the method for controlling the response utterance being reproduced and predicting the user intention, which is implemented in the computing device including the at least one processor and the at least one memory for storing the instructions executable by the processor, may include an intention prediction step (e.g., the intention prediction step (step S105) of FIG. 1).

According to one embodiment, the intention prediction step may be a step of, when a third voice signal is received from the user in a state where the first response utterance is controlled by execution of a function of the utterance control step (e.g., the utterance control step (step S103) of FIG. 1), analyzing the third voice signal through a pre-stored intention analysis algorithm to predict an intention of the user, which is reflected in a second sentence corresponding to the third voice signal, through a result of the analysis.

According to one embodiment, the intention prediction step may be a detailed step for performing the function described above, and may include a second sentence identification step (step S401) and a second clause determination step (step S403).

In the step S401, the at least one processor (hereinafter referred to as "processor") may, when the third voice signal is received from the user in a state where the first response utterance output through the chatbot is controlled by the execution of the function of the utterance control step, preprocess the third voice signal through the pre-stored voice recognition algorithm to identify the second sentence corresponding to the third voice signal.

Regarding the above configuration, the pre-stored speech recognition algorithm may be a speech-to-text (STT) modeling-based algorithm, which is an algorithm for preprocessing a third voice signal received from a user to convert the third voice signal into a second sentence that is a text.

For example, the processor may, when the third voice signal is received from the user in a state where the first response utterance is controlled by the execution of the function of the utterance control step, preprocess the third voice signal through the pre-stored voice recognition algorithm to identify "Is the work requested earlier finished?", which is the second sentence corresponding to the third voice signal.

According to one embodiment, the processor may perform the second clause determination step (step S403) when the identification of the second sentence corresponding to the third voice signal is completed.

In the step S403, the processor may, when the identification of the second sentence is completed, analyze a plurality of sentences corresponding to voice signals received from the user before the third voice signal is received through the pre-stored natural language processing algorithm and the identified second sentence to determine a clause type of each of the sentences and the second sentence.

According to one embodiment, the processor may extract the voice signals, which are received from the user before the third voice signal is received, from a voice database in order to predict the intention of the user reflected in the second sentence corresponding to the third voice signal.

In more detail, the processor may recognize a past intention of the user through the sentences and analyze the voice signals received from the user through the pre-stored voice recognition algorithm in the voice database in order to predict the intention of the user reflected in the second sentence based on the recognized past intention to identify the sentences corresponding to the voice signals.

According to one embodiment, the processor may, when the identification of the second sentence is completed, identify a plurality of morphemes included in the second sentence through the pre-stored natural language processing algorithm to check a plurality of word segments constituting the second sentence based on the identified morphemes.

For example, the processor may analyze "Is the work requested earlier finished?", which is the identified second sentence, through the pre-stored natural language processing algorithm.

Accordingly, the processor may decompose "Akka yocheonghan jageobeun kkeutnasseo? (Is the work requested earlier finished?)", which is the identified second sentence, into "Akka" v "yocheong (~hayeossdeon)" v "jageob" v "~eun" v "kkeutnasse" v "~o" to decompose the sentence into a total of six morphemes.

Regarding the above configuration, the processor may, when the second sentence is identified as a plurality of morphemes, classify each of the identified morphemes.

Types of the morphemes may be classified into a free morpheme (a morpheme that may be used alone (e.g., weather)), a bound morpheme (a morpheme that is bound to other words (e.g., ~eul, ~neun, ~da)), a full morpheme (a morpheme having a substantial meaning (e.g., today)), and an empty morpheme (a morpheme that adds a grammatical relation or a formal meaning (e.g., a postposition, a suffix, or an affix)), and the processor may analyze a type of each of the identified morphemes. In this case, the processor may classify and check the type of each of the decomposed morphemes based on pre-stored morpheme information.

According to one embodiment, the processor may, when the identification of the morphemes of the second sentence is completed, check the word segments constituting the second sentence based on the identified morphemes.

According to one embodiment, the processor may perform a tokenization process in order to check at least one word segment in the second sentence. In this case, since the Korean language is generally an agglutinative language in which morphemes do not include only independent words unlike the English language, the processor may perform a morpheme tokenization scheme rather than a word tokenization scheme when the tokenization process is performed.

According to one embodiment, the processor may recognize a plurality of morphemes and types of the morphemes included in the second sentence, classify the types of the morphemes, and recognize a combination of a free morpheme and a bound morpheme as one token to designate the recognized token as one word segment.

According to one embodiment, the processor may perform the tokenization process in the morpheme tokenization scheme to check a plurality of word segments included in the second sentence. For example, the processor may check a word segment in "Is the work requested earlier finished?". The processor may perform morpheme tokenization on "Akka yocheonghan jageobeun kkeutnasseo? (Is the work requested earlier finished?)" to check four word segments, which are "Akka" v "yocheonghayeossdeon" v "jageobeun" v "kkeutnassneunji allyeojwo".

According to one embodiment, the processor may, when the checking of the word segments of the second sentence is completed, check a part of speech of each of the morphemes included in the word segments based on pre-stored part-of-speech classification information to identify a sentence component of each of the word segments.

According to one embodiment, the processor may check the part of speech for each of the morphemes included in the word segments based on the pre-stored part-of-speech classification information to classify the sentence component of each of the word segments through the checked part of speech. In this case, the pre-stored part-of-speech classification information may represent part-of-speech tag information.

According to one embodiment, the processor may define a part of speech for each of the morphemes through the pre-stored part-of-speech classification information. The Korean language may basically define a part of speech of each of the morphemes through a five-word nine-part-of-speech tagging (part-of-speech tagging) technology. The pre-stored part-of-speech classification information may include reference morpheme information (including part-of-speech information) for defining the part of speech of each of the morphemes.

In more detail, the processor may define the part of speech for each of the morphemes through the pre-stored part-of-speech classification information, and determine a sentence component of a configuration recognized as one token among the morphemes in which the part of speech are defined. For example, the processor may classify a part of speech for "jageob" and "~eun" based on the pre-stored part-of-speech classification information. The processor may classify "jageob" as a noun, and classify "~eun" as a postposition. The processor may determine a sentence component of "jageobeun", which is recognized as one token, as an object based on the classified part of speech.

According to one embodiment, the processor may, when the classification of the sentence component for each of the word segments of the second sentence is completed, check a combination relation between the classified sentence components to determine a clause type for the second sentence.

According to one embodiment, the processor may, when the classification of the sentence component for each of the word segments of the second sentence is completed, check a combination relation between the classified sentence components to determine a clause type for the second sentence. Regarding the above configuration, the processor may determine the clause type of the sentence through a clause type table (e.g., the clause type table 207a of FIG. 2).

According to one embodiment, the processor may, when the clause type of the second sentence is determined, analyze the sentences through the pre-stored natural language processing algorithm to determine the clause type for each of the sentences.

FIG. 5 is another flowchart for describing an intention prediction step of the method for controlling the response utterance being reproduced and predicting the user intention according to one embodiment of the present invention.

Referring to FIG. 5, the method for controlling the response utterance being reproduced and predicting the user intention, which is implemented in the computing device including the at least one processor and the at least one memory for storing the instructions executable by the processor, may include an intention prediction step (e.g., the intention prediction step (step S105) of FIG. 1).

According to one embodiment, the intention prediction step may be a step of, when a third voice signal is received from the user in a state where the first response utterance is controlled by execution of a function of the utterance control step (e.g., the utterance control step (step S103) of FIG. 1), analyzing the third voice signal through a pre-stored intention analysis algorithm to predict an intention of the user, which is reflected in a second sentence corresponding to the third voice signal, through a result of the analysis.

According to one embodiment, the intention prediction step may be a detailed step for performing the function described above, and may include a keyword named-entity analysis step (step S501), a semantic information tagging step (step S503), and an intention checking step (step S505).

Regarding the above configuration, the keyword named-entity analysis step (step S501) may be a step performed in a state where execution of a function of the second clause determination step (e.g., the second clause determination step (step S403) of FIG. 4) is completed.

In the step S501, the at least one processor (hereinafter referred to as "processor") may, when the clause type of each of the sentences (corresponding to the voice signals received from the user) and the second sentence (e.g., corresponding to the third voice signal) is determined, identify full morphemes among morphemes included in each of the sentences and the second sentence as keywords through the pre-stored intention analysis algorithm to start a named-entity recognition process for the identified keywords based on a pre-stored morpheme semantic dictionary.

According to one embodiment, the processor may, when the clause type of each of the sentences and the second sentence is determined, identify the full morphemes among the morphemes included in each of the sentences and the second sentence as the keywords.

Regarding the above configuration, the keywords may be morphemes that serve as references for determining and checking an intention of a user in a sentence, in which the keywords may be set as full morphemes by a manager account, other morphemes (e.g., a free morpheme) may be additionally set as the keywords, or the keywords may be set to be changed into other morphemes.

According to one embodiment, a plurality of pieces of semantic information stored in the pre-stored morpheme semantic dictionary may be configurations for identifying meanings of the morphemes in which a plurality of homonyms exist for each clause type of the sentence.

Regarding the above configuration, the named-entity analysis process may be a process for assigning semantic information (e.g., a named-entity tag) such as a person name, a location name, or an organization name to a morpheme or a sentence component. In general, the named-entity analysis process may be a process based on a long short-term memory (LSTM)-CRF scheme or a LSTM recurrent neural network (LSTMRNN) scheme to which deep learning is applied, and may be a process based on a BERT scheme.

According to one embodiment, the processor may perform the semantic information tagging step (step S503) when the named-entity analysis process is started.

In the step S503, the processor may, as a function of the keyword named-entity analysis step (step S501) is performed, check semantic information corresponding to a meaning of each of the identified keywords based on the pre-stored morpheme semantic dictionary, and tag the checked semantic information to each of the identified keywords.

According to one embodiment, the processor may, when the checking of the semantic information for the morphemes constituting the sentence (the second sentence and the sentences) is completed, tag the checked semantic information to each of the morphemes to complete the named-entity analysis process.

In other words, the processor may, when the keyword named-entity analysis step (step S501) is completed, tag the identified semantic information to the keyword to complete the named-entity analysis process. Accordingly, the processor may analyze an intention of the sentence for the sentence (the second sentence and the sentences) including the keyword through the semantic information tagged to the keyword in the following process.

According to one embodiment, the processor may perform the intention checking step (step S505) when the semantic information tagging step (step S503) is completed.

In the step S505, the processor may, when the semantic information tagging step (step S503) is completed, check the intention of the user based on the semantic information tagged to each of the keywords and the clause type of each of the sentences and the second sentence such that a past intention of the user based on the sentences and a plurality of intentions, which are a candidate group based on a meaning derived from the second sentence, are checked to complete an intention prediction analysis process for the sentences and the second sentence.

According to one embodiment, the processor may analyze the clause type of each of the sentences and the second sentence and the semantic information tagged to the keyword through the pre-stored intention analysis algorithm to check the past intention of the user based on the sentences through a result of the analysis and check the intentions, which are the candidate group based on a meaning derived from the second sentence.

In more detail, the processor may, when the sentences and the second sentence are analyzed through the pre-stored intention analysis algorithm, analyze the clause type of each of the sentences and the second sentence and the semantic information tagged to the keyword included in the sentences and the second sentence to determine an utterance intention of the user based on the checked clause type.

Regarding the above configuration, the pre-stored intention analysis algorithm may be one of processes of the pre-stored natural language processing algorithm, and may be an algorithm for determining whether the sentence (the sentences and the second sentence) is one of an explanatory type, an opinion type, a consent type, a rejection type, and an appreciation type through the clause type, and analyzing the intention of the sentence (the sentences and the second sentence) through the semantic information tagged to the keyword.

Regarding the above configuration, since the semantic information is an intention analysis tag tagged for each keyword included in the sentence (the sentences and the second sentence), the processor may check the utterance intention of the user for the sentence (the sentences and the second sentence) through the intention analysis tag, and may determine, when a plurality of sentences (the sentences and the second sentence) are input from the user, the utterance intention of the user formed by a correlation between the input sentences through the intention analysis tag.

According to another embodiment, the processor may analyze the sentence through the pre-stored natural language processing algorithm so as to check the intention of the user to utter the third voice signal and the voice signals received from the user.

Regarding the above configuration, the processor may, when the past intention of the user based on the sentences and the intentions, which are the candidate group based on the meaning derived from the second sentence, are checked, identify a topic entity based on the keyword used to determine the intentions and the past intention of the user.

In more detail, an entity may be understood to represent core keywords and sentences of a sentence constituting a text. In other words, a word such as a topic or a subject that is common in a description of an entity may be understood as a meaningful word. Accordingly, a plurality of entities may be connected to a keyword neural network in one word, and simultaneously, a plurality of keywords may be connected to one entity.

Regarding the above configuration, the processor may identify the topic entity as a meaningful word in the sentence through a topic modeling process based on a topic modeling algorithm. In other words, the processor may, when the topic modeling process is performed, identify the topic entity based on the topic modeling process as the keyword without identifying a full morpheme among the morphemes constituting the sentence as the keyword.

For example, the topic modeling algorithm may be an algorithm that utilizes latent Dirichlet allocation (LDA) and includes a preprocessing process of recognizing a sentence as a set of words and removing a stop word, an exclamation, and a word that is less than two characters from the recognized words, a vectorizing process of digitizing the remaining words obtained through the preprocessing process in consideration of an occurrence frequency and a location, and a process of extracting a valid word through LDA modeling.

For example, a group of words may be generated by generating BoW in which a sentence is considered as a bag of words. Thereafter, when a word that is difficult to be determined as being meaningful, such as a stop word, an exclamation that is difficult to generate a meaning, a short word that is less than two characters, an article, or a definite article, is removed from the words, the preprocessing process may be completed.

Thereafter, in a case of the sentence or sample sentences collected as big data described above, after vectorizing is performed on each of the words based on the occurrence frequency and the location, a topic set that is valid words may be extracted based on LDA described above.

An LDA technique may be one of probabilistic topic model techniques for describing subjects that exist in each document for a given document by Latent Dirichlet allocation (LDA) in natural language processing. Based on a previously known word number distribution for each subject, the word number distribution of words found in the given document may be analyzed to predict subjects covered together by the document.

In detail, the LDA may be a probabilistic generation model for pieces of discrete data. The LDA may be used for pieces of data based on characters, and may also be used for other pieces of discrete data such as photographs. In the conventional information search field, attempts to recognize a potential semantic structure in a document similarly to the LDA have been continuously made. Led by TF-IDF, the LDA has been reached through latent semantic indexing (LSI), probabilistic latent semantic analysis (PLSA), and the like, which created a field referred to as topic modeling. The probabilistic latent semantic analysis may also be referred to as probabilistic latent semantic indexing (PLSI).

There may be several assumptions in the LDA, and the most important thing among the assumptions may be exchangeability of words. This may also be referred to as a "bag of words". The exchangeability may be an assumption that only the presence or absence of words is important, regardless of an order of the words. For example, it may be considered that there is no difference between "Apple is red" and "Red is apple". When the order of the words is ignored, the document may be expressed only with frequencies of the words included in the document. The LDA has presented a mixed model that includes exchangeability of words and documents based on this assumption. However, the exchangeability assumption of the LDA may be extended by a scheme (n-gram) of considering a group of specific words as one unit without simply considering one word as a unit.

Although the LDA has been devised as a method for searching for a subject of a document, there may be a possibility that the LDA may be used in various fields other than text processing, such as image processing and sound processing, may be applied to pieces of continuous data as well as pieces of discrete data, that is, pieces of discontinuous data, and may also be applied to pieces of data that do not have a polynomial distribution.

Accordingly, the processor may analyze the second sentence and the sentences through the topic modeling algorithm to identify a word, which is essentially utilized (e.g., a word that is frequently used) to determine the intentions derived based on a meaning of the second sentence and the past intention of the user derived based on meanings of the sentences, as the keyword.

As a result, the processor may, when the past intention of the user based on the sentences and the intentions, which are the candidate group based on the meaning derived from the second sentence, are checked, complete the intention prediction analysis process for the sentences and the second sentence.

According to one embodiment, the pre-stored intention analysis algorithm may include one of a feature extraction modeling-based algorithm, an embedding vector modeling-based algorithm, and a deep learning modeling-based algorithm.

Regarding the above configuration, the processor may perform the intention prediction step when a third voice signal is received from the user in a state where the first response utterance is controlled by execution of a function of the utterance control step. In this case, the processor may, when the intention prediction step is performed, analyze the third voice signal through a pre-stored intention analysis algorithm to predict an intention of the user, which is reflected in a second sentence corresponding to the third voice signal, through a result of the analysis.

In this case, the processor may analyze a sentence corresponding to a voice signal through a feature extraction modeling-based algorithm included in the pre-stored intention analysis algorithm. In this case, the processor may identify morphemes constituting the sentence through the feature extraction modeling-based algorithm to classify parts of speech constituting the sentence, and extract a vector value for a feature of the sentence based on the classified parts of speech and obtain similarity with a vector value of a sample sentence through comparison so as to extract an intention for the sentence. Regarding the above configuration, feature extraction modeling may include modeling such as BoW and Word2Vec mentioned in the present disclosure.

In addition, the processor may analyze the sentence corresponding to the voice signal through an embedding vector modeling-based algorithm included in the pre-stored intention analysis algorithm. In this case, the processor may learn a language model for various sentences input by a manager, extract an embedding vector value for the sentence through the learned language model, and obtain similarity with an embedding vector value of the sample sentence through comparison so as to extract the intention for the sentence.

Finally, the processor may analyze the sentence corresponding to the voice signal through a deep learning modeling-based algorithm included in the pre-stored intention analysis algorithm. In this case, the processor may, in a state where the processor has learned the language model for the various sentences input by the manager, add the sentence to perform fine tuning, and may perform inference on the sentence so as to extract the intention for the sentence.

In other words, the processor may, when the intention is extracted by analyzing the sentence corresponding to the voice signal through the pre-stored intention analysis algorithm, which includes one of a feature extraction modeling-based algorithm, an embedding vector modeling-based algorithm, and a deep learning modeling-based algorithm, extract the intention for the sentence corresponding to the voice signal without performing the keyword named-entity analysis step (step S501), the semantic information tagging step (step S503), and the intention checking step (step S505).

FIG. 6 is a block diagram for describing a response utterance output unit of the apparatus for controlling the response utterance being reproduced and predicting the user intention according to one embodiment of the present invention.

Referring to FIG. 6, the apparatus for controlling the response utterance and predicting the user intention, which is implemented in the computing device including the at least one processor and the at least one memory for storing the instructions executable by the processor, may include a response utterance output unit 600 (e.g., for performing the same function as the response utterance output step (step S107) of FIG. 1).

According to one embodiment, the response utterance output unit 600 may, when execution of a function of the intention prediction unit (e.g., for performing the same function as the intention prediction step (step S105) of FIG. 1) is completed, generate a response sentence for responding to the third voice signal in which the predicted intention of the user is reflected to output a response utterance based on the generated response sentence through the chatbot.

According to one embodiment, the response utterance output unit 600 may be a detailed configuration for performing the function described above, and may include a user intention identification unit 601, a response sentence generation unit 603, and a customized response provision unit 605.

According to one embodiment, the user intention identification unit 601 may, when execution of a function of the intention prediction unit is completed, identify an intention in which an association degree with the past intention exceeds a designated numerical value among the intentions as the intention of the user.

For example, the user intention identification unit 601 may check the intentions for the voice signals of the user input through the chatbot based on the past intention to check that the user firstly has an intention to inquire (inquiry process) about Korean won by inquiring about an account among banking operations, secondly has an intention to request a first currency exchange task (first currency exchange process) for exchanging Korean won into dollars, and thirdly has an intention to request a second currency exchange task (second currency exchange process) for exchanging Korean won into Yen.

Regarding the above configuration, the user intention identification unit 601 may identify a plurality of intentions for the second sentence ("Is the work requested earlier finished?") corresponding to the third voice signal. In this case, a first intention, which is one of the intentions identified by the user intention identification unit 601, may be identified as an intention to check whether the "work" having a meaning of "a task performed under predetermined purposes and plans" is finished, and a second intention, which is one of the intentions, may be identified as an intention to check whether the "work" having a meaning of "a process" is finished.

Thereafter, the user intention identification unit 601 may identify the second intention in which the association degree with the past intention of the user exceeds a designated numerical value 601a among the intentions, as the intention of the user.

According to one embodiment, the designated numerical value 601a may be a configuration derived by analyzing conversation history information in which a response utterance process for a voice signal input through the chatbot from each of a plurality of users who visit the first domain is completed based on a pre-stored artificial intelligence algorithm 607, and the designated numerical value 601a may be a reference value for identifying semantic information corresponding to the intention of the user among a plurality of pieces of semantic information tagged to the keywords, respectively, based on a correlation between a combination relation of keywords corresponding to full morphemes among morphemes constituting a sentence based on the conversation history information and a conversation order based on the conversation history information.

Regarding the above configuration, the conversation history information may be a configuration including voice signals received through a chatbot from a plurality of users who visit the first domain and response utterances provided through the chatbot in response to the received voice signals.

In other words, the pre-stored artificial intelligence algorithm 607 may be an algorithm for analyzing a correlation between the voice signals and the response utterances responding to the voice signals based on the conversation history information in which the response utterance process is completed to set the designated numerical value 601a based on the response utterances having high association degrees with the voice signals through a result of the analysis. In other words, the pre-stored artificial intelligence algorithm 607 may be an algorithm for setting the designated numerical value 601a to each of the pieces of semantic information based on a conversation order and a correlation between pieces of semantic information of the voice signals and pieces of semantic information of the response utterances for responding to the voice signals.

According to one embodiment, the user intention identification unit 601 may be a configuration for identifying the pieces of semantic information corresponding to the intentions associated with the semantic information corresponding to the past intention, respectively. In the above example, since semantic information on the "work" having the meaning of "a process" has association with the past intention, which exceeds the designated numerical value 601a, as compared with semantic information on the "work" having the meaning of "a task under predetermined purposes and plans", the user intention identification unit 601 may identify the second intention as the intention of the user reflected in the third voice signal.

According to one embodiment, the user intention identification unit 601 may, when a plurality of works (e.g., the inquiry process, the first currency exchange process, and the second currency exchange process) are requested by the user based on the past intention as in the above example, output a response utterance for inquiring about a work, which is referred to among the requested works, to the user through the chatbot.

According to another embodiment, the user intention identification unit 601 may perform a separate process for identifying a work corresponding to the intention of the user without outputting the response utterance for inquiring about the work that is referred to among the requested tasks to the user. In this case, the user intention identification unit 601 may compare a correlation between information history information (information on a provided process and a time at which information on the process is provided) provided for the work requested by the user and a time at which the third voice signal is received.

Regarding the above configuration, the user intention identification unit 601 may identify that a result for the inquiry process has already been provided to the user through the information history information, and identify that the second currency exchange process starts immediately before the third voice signal is input. Accordingly, the user intention identification unit 601 may identify that the work (process) corresponding to the intention of the user is the second currency exchange process.

According to one embodiment, the response sentence generation unit 603 may, when the identification of the intention of the user is completed, generate the response sentence for responding to the third voice signal in which the intention of the user is reflected based on a pre-stored sentence generation algorithm.

According to one embodiment, the pre-stored sentence generation algorithm may be an algorithm for forming texts from the voice signals that are previously received from the user and the third voice signal through the pre-stored natural language processing algorithm, and performing analysis by performing machine reading comprehension (MRC) on a plurality of sentences corresponding to the voice signals and the second sentence corresponding to the third voice signal, which are formed in the texts, to generate a response sentence corresponding to the intention of the user through a result of the analysis.

According to one embodiment, the customized response provision unit 605 may, when execution of a function of the response sentence generation unit 603 is completed, stop the first response utterance controlled by the execution of the function of the utterance control unit (e.g., for performing the same function as the utterance control step (step S103) of FIG. 1) and output a second response utterance based on the generated response sentence to provide a customized response for the third voice signal input from the user.

For example, the customized response provision unit 605 may, when the generation of the response sentence is completed, stop the output of the first response utterance, which is slowly output through the chatbot as a response for the second voice signal ("Just a moment, let me know slowly") by the utterance control unit, and output the second response utterance based on the generated response sentence. Accordingly, the user may receive the customized response for the third voice signal input through the chatbot.

FIG. 7 is a view for describing one example of an internal configuration of a computing device according to one embodiment of the present invention.

FIG. 7 shows one example of an internal configuration of a computing device according to one embodiment of the present invention. In the following description, redundant descriptions of the embodiment corresponding to the above descriptions for FIGS. 1 to 6 will be omitted.

As shown in FIG. 7, a computing device 10000 may at least include at least one processor 11100, a memory 11200, a peripheral interface 11300, an input/output (I/O) subsystem 11400, a power circuit 11500, and a communication circuit 11600. In this case, the computing device 10000 may correspond to a user terminal A connected to a tactile interface device, or correspond to a computing device B described above.

The memory 11200 may include, for example, a high-speed random access memory, a magnetic disk, an SRAM, a DRAM, a ROM, a flash memory, or a non-volatile memory. The memory 11200 may include a software module, an instruction set, or other various data required for an operation of the computing device 10000.

In this case, access to the memory 11200 from other components such as the processor 11100 or the peripheral interface 11300 may be controlled by the processor 11100.

The peripheral interface 11300 may couple an input and/or output peripheral device of the computing device 10000 to the processor 11100 and the memory 11200. The processor 11100 may execute the software module or the instruction set stored in the memory 11200 to perform various functions for the computing device 10000 and process data.

The I/O subsystem 11400 may couple various input/output peripheral devices to the peripheral interface 11300. For example, the I/O subsystem 11400 may include a controller for coupling the peripheral device, such as a monitor, a keyboard, a mouse, a printer, or a touch screen or a sensor if necessary, to the peripheral interface 11300. According to another aspect, input/output peripheral devices may be coupled to the peripheral interface 11300 without passing through the I/O subsystem 11400.

The power circuit 11500 may supply a power to all or some of the components of the terminal. For example, the power circuit 11500 may include a power management system, at least one power source such as a battery or an alternating current (AC), a charging system, a power failure detection circuit, a power switcher or inverter, a power status indicator, or any other components for generating, managing, or distributing a power.

The communication circuit 11600 may use at least one external port to enable communication with other computing devices.

Alternatively, as described above, the communication circuit 11600 may include an RF circuit, if necessary, to transmit and receive an RF signal, also known as an electromagnetic signal, thereby enabling the communication with other computing devices.

The above embodiment of FIG. 7 is merely one example of the computing device 10000, and the computing device 10000 may have a configuration or arrangement that omits some of the components shown in FIG. 7, further includes an additional component that is not shown in FIG. 7, or combines at least two components. For example, a computing device for a communication terminal in a mobile environment may further include a touch screen, a sensor, and the like in addition to the components shown in FIG. 7, and the communication circuit 11600 may include a circuit for RF communication in various communication schemes (Wi-Fi, 3G, LTE, Bluetooth, NFC, Zigbee, etc.). The components that may be included in the computing device 10000 may be implemented as hardware, software, or a combination of both hardware and software including at least one integrated circuit specialized in signal processing or an application.

The methods according to the embodiment of the present invention may be implemented in the form of program instructions that may be executed through various computing devices, and may be recorded in a computer-readable medium. In particular, a program according to the present embodiment may be configured as a PC-based program or an application dedicated to a mobile terminal. An application to which the present invention is applied may be installed in a user terminal through a file provided by a file distribution system. For example, the file distribution system may include a file transmission unit (not shown) for transmitting the file according to a request from the user terminal.

The device described above may be implemented as a hardware component, a software component, and/or a combination of the hardware component and the software component. For example, the devices and components described in the embodiments may be implemented by using at least one general-purpose or special-purpose computer such as a processor, a controller, an arithmetic logic unit (ALU), a digital signal processor, a microcomputer, a field programmable gate array (FPGA), a programmable logic unit (PLU), a microprocessor, or any other device capable of executing and responding to an instruction. A processing device may execute an operating system (OS) and at least one software application executed on the operating system. In addition, the processing device may access, store, manipulate, process, and generate data in response to the execution of the software. In some cases, one processing device has been described as being used for convenience of understanding. However, it will be appreciated by those skilled in the art that the processing device may include a plurality of processing elements and/or a plurality of types of processing elements. For example, the processing device may include a plurality of processors or one processor, and one controller. In addition, other processing configurations such as a parallel processor may also be possible.

The software may include a computer program, a code, an instruction, or a combination of at least one thereof, and may configure the processing device to operate as desired or instruct the processing device independently or collectively. In order for the software and/or data to be interpreted by the processing device or to provide an instruction or data to the processing device, the software and/or data may be permanently or temporarily embodied in any type of machine, component, physical device, virtual equipment, computer storage medium, or device. The software may be distributed over computing devices, which are connected through a network, so as to be stored or executed in a distributed manner. The software and data may be stored in at least one computer-readable recording medium.

The method according to the embodiment may be implemented in the form of a program instruction that may be executed through various computer mechanisms, and may be recorded in a computer-readable medium. The computer-readable medium may include a program instruction, a data file, a data structure, and the like, alone or in combination with each other. The program instruction recorded in the medium may be specially designed and configured for the embodiment, or may be publicly known and available to those skilled in the art of computer software. An example of the computer-readable recording medium includes magnetic media such as a hard disk, a floppy disk, and a magnetic tape, optical media such as a CD-ROM and a DVD, magneto-optical media such as a floptical disk, and a hardware device specially configured to store and execute a program instruction, such as a ROM, a RAM, and a flash memory. An example of the program instruction includes a high-level language code that may be executed by a computer by using an interpreter or the like, as well as a machine language code generated by a compiler. The hardware device may be configured to operate as at least one software module to perform the operations of the embodiments, and vice versa.

Although the above description has been made with reference to specific embodiments and drawings, various modifications and changes can be made by those skilled in the art from the above description. For example, even when the described techniques are performed in an order that is different from the described manner, and/or the described components such as systems, structures, devices, and circuits are coupled or combined in a form that is different from the described manner, or replaced or substituted by other components or equivalents, appropriate results may be achieved. Therefore, other implementations, other embodiments, and equivalents to the claims are also within the scope of the appended claims.

What is claimed is:

1. A method for controlling a response utterance being reproduced and predicting a user intention, which is implemented in a computing device including at least one processor and at least one memory for storing instructions executable by the processor, the method comprising:

a voice signal analysis step, by one or more processors, when a second voice signal is received from a user while a first response utterance for responding to a first voice signal received from the user is output through a chatbot of a first domain among a plurality of domains, of starting analysis on the second voice signal, wherein the one or more processors performing the voice signal analysis step are configured to perform the following steps:

a first sentence identification step, when the second voice signal is received while the first response utterance is output through the chatbot, of preprocessing the second voice signal through a pre-stored voice recognition algorithm to identify a first sentence corresponding to the second voice signal;

a morpheme-based word segment checking step, when the identification of the first sentence is completed, of identifying a plurality of morphemes included in the first sentence through a pre-stored natural language processing algorithm to check a plurality of word segments constituting the first sentence based on the identified morphemes;

a sentence component identification step, when the checking of the word segments is completed by execution of a function of the morpheme-based word segment checking step, of checking a part of speech of each of the morphemes included in the word segments based pre-stored part-of-speech classification information to identify a sentence component of each of the word segments; and a first clause determination step, when the identification of the sentence component for each of the word segments is completed by execution of a function of the sentence component identification step, of checking a combination relation between the identified sentence components to determine a clause type for the first sentence;

an utterance control step, by one or more processors, when one of preset keywords is identified to be included in a first sentence corresponding to the second voice signal in a state where execution of a function of the voice signal analysis step is completed, of controlling the first response utterance being output through the chatbot to correspond to the identified keyword;

an intention prediction step, by one or more processors, when a third voice signal is received from the user in a state where the first response utterance is controlled by execution of a function of the utterance control step, of analyzing the third voice signal through a pre-stored intention analysis algorithm to predict an intention of the user, which is reflected in a second sentence corresponding to the third voice signal, through a result of the analysis, wherein the one or more processors performing the intention prediction step are configured to perform the following steps:

a second sentence identification step, when the third voice signal is received from the user in a state where the first response utterance output through the chatbot is controlled by the execution of the function of the utterance control step, of preprocessing the third voice signal through the pre-stored cognition algorithm to identify the second sentence corresponding to the third voice signal; and a second clause determination step, when the identification of the second sentence is completed, of analyzing a plurality of sentences corresponding to voice signals received from the user before the third voice signal is received through the pre-stored natural language processing algorithm and the identified second sentence to determine a clause type of each of the sentences and a second sentence; and a response utterance output step, by one or more processors, when the intention prediction step is completed, of generating a response sentence for responding to the third voice signal in which the predicted intention of the user is reflected to output a response utterance based on the generated response sentence through the chatbot, wherein the one or more processors performing the intention prediction step are further configured to perform the following steps:

a keyword named-entity analysis step, when the clause type for each of the plurality of sentences and the second sentence is determined, of identifying full morphemes from both each sentence and the second sentence as keywords using the pre-stored intention analysis algorithm to start a named-entity recognition process for the identified keywords based on a pre-stored morpheme semantic dictionary a semantic information tagging step, as a function of the keyword named-entity analysis step is performed, of checking semantic information corresponding to a meaning of each of the identified keywords based on the pre-stored morpheme semantic dictionary, and tagging the checked semantic information to each of the identified keywords; and an intention checking step, when the semantic information tagging step is completed, of checking the intention of the user based on the semantic information tagged to each of the keywords and the clause type of each of the sentences and the second sentence such that a past intention of the user based on the sentences and a plurality of intentions, which are a candidate group based on a meaning derived from the second sentence, are checked to complete an intention prediction analysis process for the sentences and the second sentence.

2. The method of claim 1, wherein the clause type is a sentence form for the first sentence determined based on the combination relation between the sentence components for the word segments, and the clause type includes:

a first type configured by combining a subject and a predicate;

a second type configured by combining the subject, an adverb, and the predicate;

a third type configured by combining the subject, an object, and the predicate;

a fourth type configured by combining the subject, a complement, and the predicate; and a fifth type configured by combining the subject, the object, the complement, and the predicate.

3. The method of claim 2, wherein the utterance control step includes:

a keyword checking step of, when the execution of the function of the voice signal analysis step is completed, checking whether the first sentence includes a morpheme corresponding to the preset keyword, which is a core keyword for controlling the first response utterance being output through the chatbot;

an utterance stopping step of, when the first sentence is checked to include a first keyword for stopping the first response utterance being output through the chatbot among the preset keywords by execution of a function of the keyword checking step, stopping the first response utterance being output through the chatbot for a time corresponding to the checked first keyword;

an utterance output speed control step of, when the first sentence is checked to include a second keyword for changing an output speed of the first response utterance being output through the chatbot among the preset keywords by the execution of the function of the keyword checking step, outputting the first response utterance being output through the chatbot by allowing the output speed of the first response utterance to correspond to an output speed corresponding to the checked second keyword; and an utterance output section control step of, when the first sentence is checked to include a third keyword for outputting all or a portion of the first response utterance being output through the chatbot again among the preset keywords by the execution of the function of the keyword checking step, resetting and outputting the first response utterance being output through the chatbot to a section corresponding to the third keyword.

4. The method of claim 1, wherein the response utterance output step includes:

a user intention identification step of, when execution of a function of the intention prediction step is completed, identifying an intention in which an association degree with the past intention exceeds a designated numerical value among the intentions as the intention of the user;

a response sentence generation step of, when the identification of the intention of the user is completed, generating the response sentence for responding to the third voice signal in which the intention of the user is reflected based on a pre-stored sentence generation algorithm; and a customized response provision step of, when execution of a function of the response sentence generation step is completed, stopping the first response utterance controlled by the execution of the function of the utterance control step and outputting a second response utterance based on the generated response sentence to provide a customized response for the third voice signal input from the user.

5. The method of claim 4, wherein the designated numerical value is a configuration derived by analyzing conversation history information in which a response utterance process for a voice signal input through the chatbot from each of a plurality of users who visit the first domain is completed based on a pre-stored artificial intelligence algorithm, and the designated numerical value is a reference value for identifying semantic information corresponding to the intention of the user among a plurality of pieces of semantic information tagged to the keywords, respectively, based on a correlation between a combination relation of keywords corresponding to full morphemes among morphemes constituting a sentence based on the conversation history information and a conversation order based on the conversation history information.

6. A method for controlling a response utterance being reproduced and predicting a user intention, which is implemented in a computing device including at least one processor and at least one memory for storing instructions executable by the processor, the method comprising:

a voice signal analysis step of, by one or more or sssors, when a second voice signal is received from a user while a first response utterance for responding to a first voice signal received from the user is output through a chatbot of a first domain among a plurality of domains, starting analysis on the second voice signal, wherein the one or more processors performing the voice signal analysis step are configured to perform the following steps:

a first sentence identification step, when the second voice signal is received while the first response utterance is output through the chatbot, of preprocessing the second voice signal through a pre-stored voice recognition algorithm to identify a first sentence corresponding to the second voice signal;

a morpheme-based word segment checking step, when the identification of the first sentence is completed, of identifying a plurality of morphemes included in the first sentence through a pre-stored natural quage processing algorithm to check a plurality of word segments constituting the first sentence based on the identified morphemes;

a sentence component identification step, when the checking of the word segments is completed by execution of a function of the morpheme-based word segment checking step, of checking a part of speech of each of the morphemes included in the word segments based on pre-stored part-of-speech classification information to identify a sentence component of each of the word segments; and a first clause determination step, when the identification of the sentence component for each of the word segments is completed by execution of a function of the sentence component identification step, of checking a combination relation between the identified sentence components to determine a clause type for the first sentence;

an utterance control step, by one or more processors, when one of preset keywords is identified to be included in a first sentence corresponding to the second voice signal in a state where execution of a function of the voice signal analysis step is completed, of controlling the first response utterance being output through the chatbot to correspond to the identified keyword;

an intention prediction step, by one or more processors, when a third voice signal is received from the user in a state where the first response utterance is controlled by execution of a function of the utterance control step, of analyzing the third voice signal through a pre-stored intention analysis algorithm to predict an intention of the user, which is reflected in a second sentence corresponding to the third voice signal, through a result of the analysis, wherein the one or more processors performing the intention prediction step is configured to perform the following steps;

a second sentence identification step, when the third voice signal is received from the user in a s te where the first response utterance output through the chatbot is controlled by the execution of the function of the utterance control step, of preprocessing the third voice signal through the pre-stored voice recognition algorithm to identify the second sentence corresponding to the third voice signal; and a second clause determination step, when the identification of the second sentence is completed, of analyzing a plurality of nces ponding to voice signals received from the user the third voice sig al is received through the pre-stored natural language processing algorithm and the identified sentence to determine a clause type of each of the sentences and the second sentence; and a process checking response utterance output step, by one or more processors, when a plurality of past request processes corresponding to voice signals received before the third voice signal is received, respectively, are provided in a state where the intention of the user reflected in the third voice signal is checked as an intention to request checking on one of the past request processes that are previously requested by execution of a function of the intention prediction step, of analyzing pre-stored process history information and the intention of the user reflected in the third voice signal to identify a past request process based on the intention of the user reflected in the third voice signal, and generating a process checking response sentence for allowing the user to check the identified past request process to output a process checking response utterance based on the generated process checking response sentence through the chatbot, wherein the one or more proce sors performing the intention prediction step are further configured t perform the follo steps:

a keyword named-entity analysis step, when the clause type for each of the plurality of sentences and the second sentence is determined, of identifying full morphemes from both each sentence and the second sentence as keywords using the pre-stored intention analysis algorithm to start a named-entity recognition process for the identified keywords based on a pre-stored morpheme semantic dictionary;

a semantic information tagging step, as a function of the keyword named-entity analysis step is performed, of checking semantic information corresponding to a meaning of each of the identified keywords based on the pre-stored morpheme semantic dictionary, and tagging the checked semantic information to each of the identified keywords, and an intention checking step, when the semantic information tagging step is completed, of checking the intention of the user based on the semantic information tagged to each of the keywords and the clause type of each of the sentences and the second sentence such that a past intention of the user based on the sentences and a plurality of intentions, which are a candidate group based on a meaning derived from the second sentence, are checked to complete an intention prediction analysis process for the sentences and the second sentence.

7. The method of claim 6, wherein the clause type is a sentence form for the first sentence determined based on the combination relation between the sentence components for the word segments, and the clause type includes:

a first type configured by combining a subject and a predicate;

a second type configured by combining the subject, an adverb, and the predicate;

a third type configured by combining the subject, an object, and the predicate;

a fourth type configured by combining the subject, a complement, and the predicate; and a fifth type configured by combining the subject, the object, the complement, and the predicate.

8. The method of claim 7, wherein the utterance control step includes:

a keyword checking step of, when the execution of the function of the voice signal analysis step is completed, checking whether the first sentence includes a morpheme corresponding to the preset keyword, which is a core keyword for controlling the first response utterance being output through the chatbot;

an utterance stopping step of, when the first sentence is checked to include a first keyword for stopping the first response utterance being output through the chatbot among the preset keywords by execution of a function of the keyword checking step, stopping the first response utterance being output through the chatbot for a time corresponding to the checked first keyword;

an utterance output speed control step of, when the first sentence is checked to include a second keyword for changing an output speed of the first response utterance being output through the chatbot among the preset keywords by the execution of the function of the keyword checking step, outputting the first response utterance being output through the chatbot by allowing the output speed of the first response utterance to correspond to an output speed corresponding to the checked second keyword; and an utterance output section control step of, when the first sentence is checked to include a third keyword for outputting all or a portion of the first response utterance being output through the chatbot again among the preset keywords by the execution of the function of the keyword checking step, resetting and outputting the first response utterance being output through the chatbot to a section corresponding to the third keyword.

9. The method of claim 6, wherein the process checking response utterance output step includes:

a user intention identification step of, when execution of a function of the intention prediction step is completed, identifying an intention in which an association degree with the past intention exceeds a designated numerical value among the intentions as the intention of the user;

a response sentence generation step of, when the identification of the intention of the user is completed, generating the response sentence for responding to the third voice signal in which the intention of the user is reflected based on a pre-stored sentence generation algorithm; and a customized response provision step of, when execution of a function of the response sentence generation step is completed, stopping the first response utterance controlled by the execution of the function of the utterance control step and outputting a second response utterance based on the generated response sentence to provide a customized response for the third voice signal input from the user.

10. The method of claim 9, wherein the designated numerical value is a configuration derived by analyzing conversation history information in which a response utterance process for a voice signal input through the chatbot from each of a plurality of users who visit the first domain is completed based on a pre-stored artificial intelligence algorithm, and the designated numerical value is a reference value for identifying semantic information corresponding to the intention of the user among a plurality of pieces of semantic information tagged to the keywords, respectively, based on a correlation between a combination relation of keywords corresponding to full morphemes among morphemes constituting a sentence based on the conversation history information and a conversation order based on the conversation history information.

11. The method of claim 10, wherein the process checking response utterance output step further includes:

a past request process checking step of, when the intention of the user reflected in the third voice signal is checked as the intention to request the checking on one of the past request processes that are previously requested in a state where the execution of the function of the intention prediction step is completed, checking a past request process that is previously requested by the user;

an intention-based process search step of, when the past request processes corresponding to the voice signals received before the third voice signal is received, respectively, are checked by execution of a function of the past request process checking step, analyzing the pre-stored process history information and the intention of the user reflected in the third voice signal; and a process checking response provision step of identifying the past request process based on the intention of the user reflected in the third voice signal through a result of analyzing the pre-stored process history information and the intention of the user reflected in the third voice signal by execution of a function of the intention-based process search step, and generating the process checking response sentence for allowing the user to check the identified past request process to output the process checking response utterance based on the generated process checking response sentence through the chatbot.

12. An apparatus for controlling a response utterance being reproduced and predicting a user intention, which is implemented in a computing device including at least one processor and at least one memory for storing instructions executable by the processor, the apparatus comprising:

a voice signal analysis processor for, when a second voice signal is received from a user while a first response utterance for responding to a first voice signal received from the user is output through a chatbot of a first domain among a plurality of domains, starting analysis on the second voice signal, wherein the voice signal analysis processor is configured to perform the following steps:

a first sentence identification step, when the second voice signal is received while the first respons e utterance is output through the chatbot, of preprocessing the second voice signal through a pre-stored voice recognition algorithm to identify a first sentence corresponding to the second voice signal;

a morpheme-based word segment checking step, when the identification of the first sentence completed, of identifying a plurality of morphemes included in the first sentence through a pre-stored natural language processing algorithm to check a plurality of word segments constituting the first sentence based on the identified morphemes;

a sentence component identification step, when the checking of the word segments is completed by execution of a function of the morpheme-based word segment checking step, of checking a part of De ach of each of he morphemes included in the word segments based on pre-stored part-of-speech classification information to identify a sentence component of each of the word segments; and a first clause determination step, when the identification of the sentence component for each of the word segments is completed by execution of a function of the sentence component identification step, of checking a combination relation between the identified sentence components determine a clause type for the first sentence;

an utterance control processor for, when one of preset keywords is identified to be included in a first sentence corresponding to the second voice signal in a state where execution of a function of the voice signal analysis processor is completed, controlling the first response utterance being output through the chatbot to correspond to the identified keyword;

an intention prediction processor for, when a third voice signal is received from the user in a state where the first response utterance is controlled by execution of a function of the utterance control processor, analyzing the third voice signal through a pre-stored intention analysis algorithm to predict an intention of the user, which is reflected in a second sentence corresponding to the third voice signal, through a result of the analysis, wherein the intention prediction processor is configured to perform the following steps:

a second sentence identification step, when the third voice signal is received from the user in a state where the first response utterance output through the chatbot is controlled by the execution of the function of the utterance control step, of preprocessing the third voice signal through the pre-stored voice recognition algorithm to identify the second sentence corresponding to the third voice signal; and a second clause determination step, when the identification of the second sentence is completed, of analyzing a plurality of sentences corresponding to voice signals received from the user before the third voice signal is received through the pre-stored natural language processing algorithm and the identified second sentence to determine a clause type of each of the sentences and the second sentence; and a response utterance output processor for, when execution of a function of the intention prediction processor is completed, generating a response sentence for responding to the third voice signal in which the predicted intention of the user is reflected to output a response utterance based on the generated response sentence through the chatbot, wherein the intention prediction processor is further configured to perform the following steps:

a keyword named-entity analysis step, when the clause type for each of the plurality of sentences and the second sentence is determined, of identifying full morphemes from both each sentence and the second sentence as keywords using the pre-stored intention analysis algorithm to start a named-entity recognition process for the identified keywords based on a pre-stored morpheme semantic dictionary;

a semantic information tagg step, as a function of the keyword named-entity analysis step is performed, of chec kina semantic information corresponding to a meaning of each of the identified keywords based on the pre-stored morpheme semantic dictionary, and tagging the checked semantic information to each of the identified keywords; and an intention checking step, when the semantic information tagging step is completed, of checking the Intention of the user based on the semant information tagged to each of the keywords and the clause type of each of the sentences and the second sentence such that a past intention of the user based on the sentences and a plurality of intentions, which are a candidate group based on a meaning derived from the second sentence, are checked to complete an intention prediction analysis process for the sentences and the second sentence.

13. An apparatus for controlling a response utterance being reproduced and predicting a user intention, which is implemented in a computing device including at least one processor and at least one memory for storing instructions executable by the processor, the apparatus comprising:

a voice signal analysis processor for, when a second voice signal is received from a user while a first response utterance for responding to a first voice signal received from the user is output through a chatbot of a first domain among a plurality of domains, starting analysis on the second voice signal, wherein the voice signal analysis processor is configured to perform the following steps:

a first sentence identification step, when the s cond voice signal is received while the first response utterance is output through the chatbot, of preprocessing the second voice signal rough a pre-stored voice recognition algorithm to identify a first sentence corresponding to the second voice signal;

a morpheme-based word segment checking step, when the identification of the first sentence is completed, of identifying a plurality of morphemes included in the first sentence through a pre-stored natural language processing algorithm to check a plurality of word segments constituting the first sentence based on the identified morphemes;

an utterance control processor for, when one of preset keywords is identified to be included in a first sentence corresponding to the second voice signal in a state where execution of a function of the voice signal analysis processor is completed, controlling the first response utterance being output through the chatbot to correspond to the identified keyword;

an intention prediction processor for, when a third voice signal is received from the user in a state where the first response utterance is controlled by execution of a function of the utterance control processor, analyzing the third voice signal through a pre-stored intention analysis algorithm to predict an intention of the user, which is reflected in a second sentence corresponding to the third voice signal, through a result of the analysis, wherein the intention prediction processor is configured to perform the following steps:

a second sentence identification step, while the third voice signal is received from the user when the first response utterance output through the chatbot is controlled by the execution of the function of the utterance control step, of preprocessing the third voice signal using the pre-stored voice recognition algorithm to identify the second sentence; and a second clause determination step, after completion of identification of the second sentence, of analyzing (i) a plurality of sentences corresponding to voice signals received from the user before the third voice signal is received using the pre-stored natural language pr cessing algorithm and (ii) the identified second sentence to determine a clause type for each of the plurality of sentences and the second sentence; and a process checking response utterance output processor for, when a plurality of past request processes corresponding to voice signals received before the third voice signal is received, respectively, are provided in a state where the intention of the user reflected in the third voice signal is checked as an intention to request checking on one of the past request processes that are previously requested by execution of a function of the intention prediction processor, analyzing pre-stored process history information and the intention of the user reflected in the third voice signal to identify a past request process based on the intention of the user reflected in the third voice signal, and generating a process checking response sentence for allowing the user to check the identified past request process to output a process checking response utterance based on the generated process checking response sentence through the chatbot, wherein the intention prediction processor is further configured to perform the following steps:

a keyword named-entity analy step, when the clause type for each of the plurality of sentences and the second sentence is determined, of identifying full morphemes from both each sen ence and the second sentence as keywords using the pre-stored intention analysis algorithm to start a named-entity recognition process for the identified keywords based on a pre-stored morpheme semantic dictionary;

a semantic information tagging step of, as a function of the keyword named-entity analysis step is performed, checking semantic information corresponding to a meaning of each of the identified keywords based on the pre-stored morpheme semantic dictionary, and tagging the checked semantic information to each of the identified keywords; and an intention checking step of, when the semantic information tagging step is completed, checking the intention of the user based on the semantic information tagged to each of the keywords and the clause type of each of the sentences and the second sentence such that a past intention of the user based on the sentences and a plurality of intentions, which are a candidate group based on a meaning derived from the second sentence, are checked to complete an intention prediction analysis process for the sentences and second sentence.

14. A computer-readable recording medium, wherein the computer-readable recording medium stores instructions for allowing a computing device to perform:

a voice signal analysis step of, by one or more processors, when a second voice signal is received from a user while a first response utterance for responding to a first voice signal received from the user is output through a chatbot of a first domain among a plurality of domains, starting analysis on the second voice signal, wherein the one or more processors performing the voice signal analysis step are configured to perform the following steps:

a first sentence identification step, when the second voice signal is received while the first respor e utterance is output through the chatbot, of preprocessing the second voice signal through a pre-stored voice recognition algorithm to identify a first sentence correspo ding to the second voice signal;

a morphem-based word segment checking step, when the identification of the first sentence s completed, of identify plurality of morphemes included in the first sentence through a pre-stored natural language processing algorithm to check a plurality of word segments constituting the first sentence based on the identified morphemes;

a sentence component identification step, when the checking of the word segments is completed by execution of a function of the morpheme-based word segment checking step, of checking a part of speech of each of the morphemes included in the word segments based on pre-stored part-of-speech classification information to identify a sentence component of each of the word segments; and a first clause determination step, when the identification of the sentence component for each of the word segments is completed by execution of a function of the sentence component identification step, of checking a combination relation between the identified sentence components to determine a clause type for the first sentence;

an utterance control step of, by one or more processors, when one of preset keywords is identified to be included in a first sentence corresponding to the second voice signal in a state where execution of a function of the voice signal analysis step is completed, controlling the first response utterance being output through the chatbot to correspond to the identified keyword;

an intention prediction step of, by one or more processors, when a third voice signal is received from the user in a state where the first response utterance is controlled by execution of a function of the utterance control step, analyzing the third voice signal through a pre-stored intention analysis algorithm to predict an intention of the user, which is reflected in a second sentence corresponding to the third voice signal, through a result of the analysis, wherein the one or more processors performing the intention prediction step are configured to perform the following steps:

a second sentence identification step, when the third voice signal is received from the user in a state where the first response utterance output through the chatbot is controlled by the execution of the function of the utterance control step, of preprocessing rd voice signal through the pre-stored voice recognition algorithm to identify the second sentence corresponding to the third voice signal; and a second clause determination step, when the tification of the second sentence is completed, of analyzing a plurality of sentences corresponding to voice signals received from the user before the third voice signal is received through the pre-stored natural language processing algorithm and the identified second sentence to determine a clause type of each of the sentences and the second sentence; and a response utterance output step of, by one or more processors, when the intention prediction step is completed, generating a response sentence for responding to the third voice signal in which the predicted intention of the user is reflected to output a response utterance based on the generated response sentence through the chatbot, wherein the one or more processor performing the intention prediction step are further configured to perform the following steps:

a keyword named-entity analysis step, when the clause type for each of the plurality of sentences and the second sentence is determined, of identifying full morphemes from both each sentence and the second ence as keywords using the pre-stored intention analysis algorithm to start a named-entity recognition process for the identified keywords based on a pre-stored morpheme semantic dictionary;

a semantic information tagging step of, as a function of the keyword named-entity analysis step is performed, checking semantic information corresponding to a meaning of each of the identified keywords based on the pre-stored morpheme semantic dictionary, and tagging the checked semantic information to each of the identified keywords, and an intention checking step of, when the semantic information tagging step is completed, checking the intention of the user based on the semantic information tagged to each of the keywords and the clause type of each of the sentences and the second sentence such that a past intention of the user based on the se itences and a plurality of intentions, which are a candidate roup based on a meani ved from the second sentence, are checked to complete an intention prediction analysis process for the sentences and the second sentence.

15. A computer-readable recording medium, wherein the computer-readable recording medium stores instructions for allowing a computing device to perform:

a voice signal analysis step of, by one or more processors, when a second voice signal is received from a user while a first response utterance for responding to a first voice signal received from the user is output through a chatbot of a first domain among a plurality of domains, starting analysis on the second voice signal, wherein the one or more processors performing the voice signal analysis step are configured to perform the following steps:

a first sentence identification step, when the second voice signal is received while the first response utterance is output through the chatbot, of preprocessing the second voice signal through a pre-stored voice recognition algorithm to identify a first sentence corresponding to the second voice signal;

a morpheme-based word segment checking step, when the identification of the first sentence is completed, of identifying a plurality of morphemes included in the first sentence through a pre-stored natural language processing algorithm to check a plurality of word segments constituting the first sentence based on the identified morphemes;

a sentence component identification step, when the checking of the word segments is completed by execution of a function of the morpheme-based word segment checking step, of checking a part of speech of each of the morphemes included in the word segments based on pre-stored part-of-speech classification information to identify a sentence component of each of the word segments; and a first clause detern nation step, when the identification of the sentence component for each of the word segments is completed by execution of a function of the sentence component identification step, of checking a combination relation between the identified sentence components to determine a clause type for the first sentence;

an utterance control step of, by one or more processors, when one of preset keywords is identified to be included in a first sentence corresponding to the second voice signal in a state where execution of a function of the voice signal analysis step is completed, controlling the first response utterance being output through the chatbot to correspond to the identified keyword;

an intention prediction step of, by one or more processors, when a third voice signal is received from the user in a state where the first response utterance is controlled by execution of a function of the utterance control step, analyzing the third voice signal through a pre-stored intention analysis algorithm to predict an intention of the user, which is reflected in a second sentence corresponding to the third voice signal, through a result of the analysis, wherein the one or more processors performing the intention prediction step are configured to perform the following steps:

a second sentence identification step, when the third voice signal is received from the user in a state where the first response utterance output through the chatbot is controlled by the execution of function of the utterance control step, of preprocessing the third voice signal through the pre-stored voice recognition algorithm to identify the second sentence corresponding to the third voice signal; and a second clause determination step, when the identification of the second sentence is completed, of analyzing a plurality of sentences corresponding to voice signals received from the user before the third voice received through the pre-stored natural language ocessing algorithm and the identified second sentence to determine a clause type of each of the sentences and the second sentence; and a process checking response utterance output step of, by one or more processors, when a plurality of past request processes corresponding to voice signals received before the third voice signal is received, respectively, are provided in a state where the intention of the user reflected in the third voice signal is checked as an intention to request checking on one of the past request processes that are previously requested by execution of a function of the intention prediction step, analyzing pre-stored process history information and the intention of the user reflected in the third voice signal to identify a past request process based on the intention of the user reflected in the third voice signal, and generating a process checking response sentence for allowing the user to check the identified past request process to output a process checking response utterance based on the generated process checking response sentence through the chatbot, wherein the one or more processors performing the intention prediction step are further configured to perform the following steps:

a keyword named-entity analysis step, when the clause type for each of the plurality of sentences and the second sentence is determined, of identifying full morphemes from both each sentence and the second sentence as keywords using the pre-stored intention analysis algorithm to start a named-entity recognition process for the identified keywords base d on a pre-stored morpheme semantic dictionary;

a semantic information tagging step, as a function of the keyword named-entity analysis step is performed, of checking semantic information corresponding to a meaning of each of the identified keywords based on the pre-stored morpheme semantic dictionary, and tagging the checked semantic information to each of the identified keywords, and an intention checking step, when the semantic information tagging step is completed, of checking the intention of the user based on the semantic information tagged to each of the keywords and the clause type of each of the sentences and the second sentence such that a past intention of the user based on the sentences and a plurality of intentions, which are a candidate group based on a meaning derived from the second sentence, are checked to complete an intention prediction analysis process for the sentences and the second sentence.

* * * * *